US011620032B2

(12) United States Patent
Yang et al.

(10) Patent No.: US 11,620,032 B2
(45) Date of Patent: *Apr. 4, 2023

(54) METHOD AND APPARATUS FOR EGO-CENTRIC 3D HUMAN COMPUTER INTERFACE

(71) Applicant: WEST TEXAS TECHNOLOGY PARTNERS, LLC, Waco, TX (US)

(72) Inventors: Allen Yang Yang, Richmond, CA (US); Sleiman Itani, East Palo Alto, CA (US)

(73) Assignee: WEST TEXAS TECHNOLOGY PARTNERS, LLC, Waco, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/241,613

(22) Filed: Apr. 27, 2021

(65) Prior Publication Data

US 2021/0247890 A1 Aug. 12, 2021

Related U.S. Application Data

(63) Continuation of application No. 16/540,418, filed on Aug. 14, 2019, now Pat. No. 11,016,631, which is a continuation of application No. 15/499,712, filed on Apr. 27, 2017, now Pat. No. 10,423,296, which is a continuation of application No. 13/854,255, filed on Apr. 1, 2013, now abandoned.

(60) Provisional application No. 61/619,242, filed on Apr. 2, 2012.

(51) Int. Cl.
*G06F 3/04815* (2022.01)
*G02B 27/01* (2006.01)
*G06F 3/01* (2006.01)

(52) U.S. Cl.
CPC ....... *G06F 3/04815* (2013.01); *G02B 27/017* (2013.01); *G06F 3/011* (2013.01); *G06F 3/017* (2013.01)

(58) Field of Classification Search
CPC ...... G06F 3/04815; G06F 3/011; G06F 3/017; G02B 27/017
See application file for complete search history.

(56) References Cited

U.S. PATENT DOCUMENTS 5,790,371 A 8/1998 Latocha et al.
6,618,047 B1 9/2003 Lim
6,798,412 B2 9/2004 Cowperthwaite
(Continued)

*Primary Examiner* — Adam R. Giesy
(74) *Attorney, Agent, or Firm* — Whiteford, Taylor & Preston, LLP; Gregory M. Stone

(57) ABSTRACT

In the method, a processor generates a three dimensional interface with at least one virtual object, defines a stimulus of the interface, and defines a response to the stimulus. The stimulus is an approach to the virtual object with a finger or other end-effector to within a threshold of the virtual object. When the stimulus is sensed, the response is executed. Stimuli may include touch, click, double click, peg, scale, and swipe gestures. The apparatus includes a processor that generates a three dimensional interface with at least one virtual object, and defines a stimulus for the virtual object and a response to the stimulus. A display outputs the interface and object. A camera or other sensor detects the stimulus, e.g. a gesture with a finger or other end-effector, whereupon the processor executes the response. The apparatus may be part of a head mounted display.

20 Claims, 23 Drawing Sheets

(56) References Cited

U.S. PATENT DOCUMENTS

| | | | |
|---|---|---|---|
| 7,493,153 B2 | 2/2009 | Ahmed et al. | |
| 7,898,522 B2 | 3/2011 | Hildreth et al. | |
| 8,334,867 B1 | 12/2012 | Davidson | |
| 8,458,225 B2 | 6/2013 | Salemann | |
| 9,063,649 B2 | 6/2015 | Kim | |
| 9,495,068 B2 | 11/2016 | Morishita et al. | |
| 10,013,138 B2 | 7/2018 | Itani | |
| 2004/0233222 A1 | 11/2004 | Lee et al. | |
| 2007/0200847 A1 | 8/2007 | Rossler et al. | |
| 2010/0253679 A1 | 10/2010 | Vyakhirev | |
| 2011/0107270 A1 | 5/2011 | Wang et al. | |
| 2011/0128555 A1 | 6/2011 | Rotschild et al. | |
| 2011/0169832 A1 | 7/2011 | Brown et al. | |
| 2011/0179368 A1 | 7/2011 | King et al. | |
| 2012/0117514 A1 | 5/2012 | Kim et al. | |
| 2012/0287044 A1* | 11/2012 | Bell | G06F 3/017 345/158 |
| 2013/0083018 A1 | 4/2013 | Geisner et al. | |
| 2013/0257692 A1 | 10/2013 | Yang et al. | |
| 2014/0002491 A1* | 1/2014 | Lamb | G02B 27/017 345/633 |
| 2014/0181755 A1 | 6/2014 | Oh et al. | |
| 2014/0347329 A1 | 11/2014 | Ware | |

\* cited by examiner

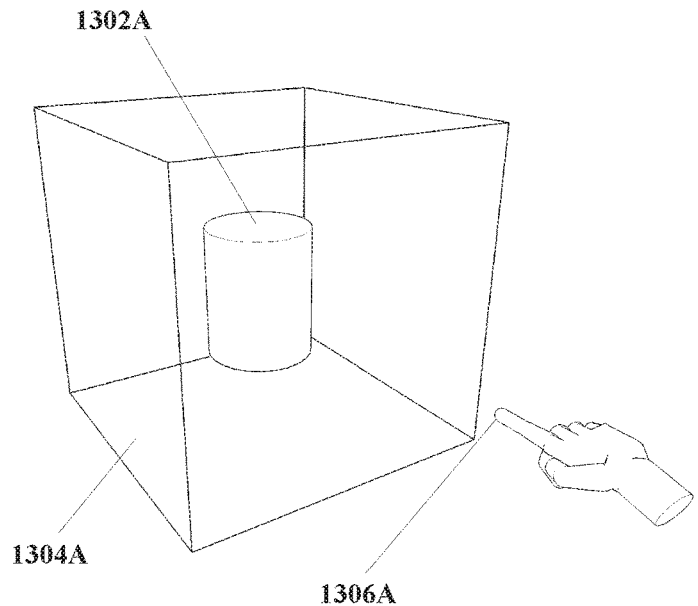
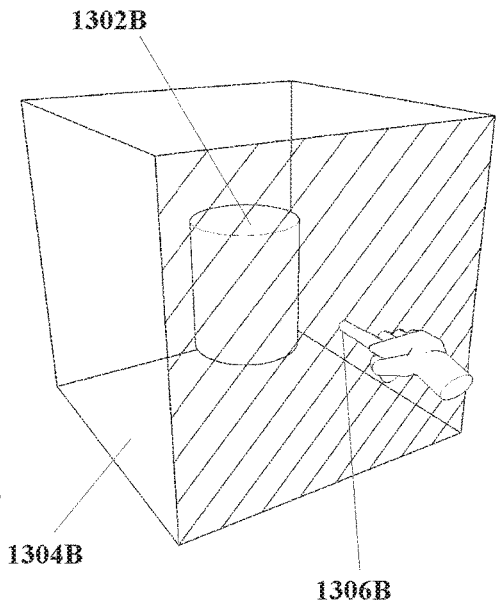
FIG. 13A
FIG. 13B
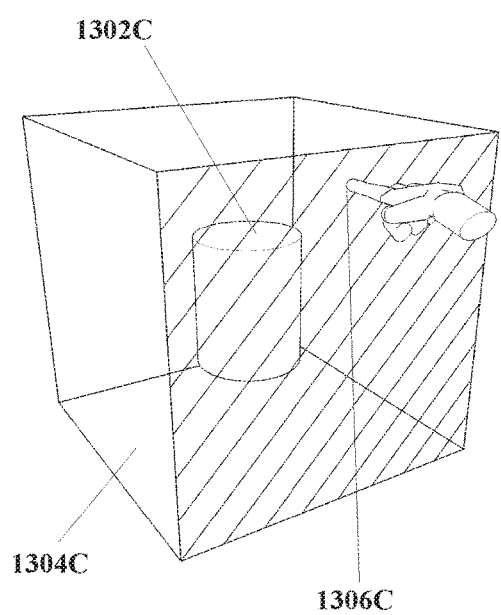
FIG. 13C

METHOD AND APPARATUS FOR EGO-CENTRIC 3D HUMAN COMPUTER INTERFACE

CROSS-REFERENCE TO RELATED APPLICATION

This application is a continuation of U.S. patent application Ser. No. 16/540,418 filed Aug. 14, 2019, which is a continuation application of U.S. patent application Ser. No. 15/499,712, filed Apr. 27, 2017, which is a continuation application of U.S. patent application Ser. No. 13/854,255, filed on Apr. 1, 2013, which claims the benefit of U.S. provisional Application No. 61/619,242, filed on Apr. 2, 2012, the contents of which are incorporated by reference for all intents and purposes. This application also incorporates by reference U.S. patent application Ser. No. 13/797,715, filed on Mar. 12, 2013, U.S. provisional application No. 61/721,948, filed on Nov. 2, 2012, the contents of which are incorporated by reference for all intents and purposes.

FIELD

This disclosure relates to three dimensional interfaces. More particularly, this disclosure relates to approaches for user interaction with three dimensional interfaces, and the behavior of three dimensional interfaces responsive to user actions.

DESCRIPTION OF RELATED ART

Generally speaking, a user interface is the space or environment wherein a user interacts with some system. The term is frequently applied to the use of computers and other information systems.

To date, many user interfaces have been designed to support interaction in two dimensions. This approach can be functional for a user interface in a two dimensional environment, such as a flat display screen. However, two dimensional interfaces can be problematic for systems that operate in more than two dimensions. e.g. three dimensional interfaces.

There is a need for a simple, efficient method and apparatus for interacting with a three dimensional interface.

SUMMARY

The present disclosure contemplates a variety of systems, apparatus, methods, and paradigms for interacting with a three dimensional interface.

In one embodiment of the present disclosure, a method is provided that includes, in a processor, generating a three dimensional interface and at least one virtual object in the interface, defining a stimulus of the interface, and defining a response to the stimulus. The method includes sensing the stimulus, and executing the response. The stimulus includes approaching the virtual object with an end-effector to within a threshold.

The response may include the processor registering a touch input.

The threshold may include a distance between the end-effector and the virtual object, and/or may include contact between the end-effector and the virtual object.

The method may include defining an interaction zone associated with the virtual object, wherein the threshold includes contact with the interaction zone.

The end effector may include a stylus, a hand, and/or a finger.

Each virtual object may define a response therefor, and/or each virtual object may have a unique response defined therefor.

The stimulus may include withdrawing the end-effector from beyond the threshold within a first time interval. The response may include the processor registering a single click input.

The stimulus may include repeating the approach to the virtual object with the end-effector to within the threshold within a second time interval, and repeating the withdrawal from the end-effector from the object beyond the threshold within another such first time interval. The response may include the processor registering a double click input.

The stimulus may include maintaining the end-effector within the threshold of the virtual object for at least a third time interval. The response may include the processor registering a peg input. The response may include engaging a location of the virtual object with the end-effector. The response may terminate if the end-effector is withdrawn from the virtual object beyond the threshold.

The stimulus may include approaching the virtual object with first and second end-effectors to within the threshold, the end-effectors being separated by a range. The response may include the processor registering a peg input. The response may include engaging a location of the virtual object with at least one of the end-effectors. The first and second end-effectors may be first and second fingers on a hand.

The first and second end-effectors may approach the virtual object within the threshold within a peg time interval. The first and second end-effectors may approach the virtual object to within the threshold substantially simultaneously. The response may terminate if the separation of the first and second end-effectors is outside the range.

The stimulus may include approaching the virtual object with a third end-effector to within the threshold, maintaining the third end-effector within the threshold of the virtual object for at least the third time interval, and altering a distance between the first and third end-effectors. The response may include registering a scale input. The scale input may include a change in magnitude of at least one dimension of the virtual object.

The stimulus may include approaching the virtual object with third and fourth end-effectors to within the threshold, the end-effectors being separated by a range, defining a first composite point from the first and second end-effectors, defining a second composite point from the third and fourth end-effectors, and altering a distance between the first and second composite points. The response may include the processor registering a scale input.

The stimulus may include translating the end-effector, while maintaining the end-effector within the threshold. The response may include the processor registering a swipe input.

The stimulus may include translating the end-effector up, and the response may include the processor registering an up-swipe.

The stimulus may include translating the end-effector down, and the response may include the processor registering a down-swipe. The stimulus may include translating the end-effector left, and the response may include the processor registering a left-swipe. The stimulus may include translating the end-effector right, and the response may include the processor registering a right-swipe. The stimulus may include translating the end-effector in toward the user, and the response may include the processor registering an in-swipe. The stimulus may include translating the end-effector out away from the user, and the response may include the processor registering an out-swipe. The stimulus may include translating the end-effector in a clockwise motion, and the response may include the processor registering a clockwise-swipe. The stimulus may include translating the end-effector in a counterclockwise motion, and the response may include the processor registering a counterclockwise-swipe.

In another embodiment of the present disclosure, an apparatus is provided that includes a processor, at least one display in communication with the processor, and at least one sensor in communication with the processor. The processor is adapted to generate a three dimensional interface and at least one virtual object therein, to define a stimulus of the interface, and to define a response to the stimulus. The processor is also adapted to execute the response. The display is adapted to output the interface. The sensor is adapted to sense the stimulus. The stimulus includes approaching the virtual object with an end-effector to within a threshold.

The response may include the processor registering a touch input.

The stimulus may include withdrawing the end-effector from the object beyond the threshold within a first time interval. The response may include the processor registering a single-click input.

The stimulus may include approaching the virtual object with the end-effector to within the threshold within a second time interval, and withdrawing the end-effector from the object beyond the threshold within the first time interval. The response may include the processor registering a double-click input.

The stimulus may include maintaining the end-effector within the threshold of the virtual object for at least a third time interval. The response may include the processor registering a peg input. The response may include engaging a location of the virtual object with the end-effector.

The stimulus may include approaching the virtual object with first and second end-effectors to within the threshold, the first and second end-effectors being separated by a range. The response may include the processor registering a peg input. The response may include engaging a location of the virtual object with at least one of the end-effectors.

The stimulus may include approaching the virtual object with a third end-effector to within the threshold, maintaining the third end-effector within the threshold of the virtual object for at least a third time interval, and altering a distance between the first and third end-effectors. The response may include the processor registering a scale input. The scale input may include a change in a magnitude of at least one dimension of the virtual object.

The stimulus may include approaching the virtual object with third and fourth end-effectors to within the threshold, the third and fourth end-effectors being separated by the range, defining a first composite point from the first and second end-effectors, defining a second composite point from the third and fourth end-effectors, and altering the distance between the first and second composite points. The response may include the processor registering a scale input. The scale input may include a change in a magnitude of at least one dimension of the virtual object.

The stimulus may include translating the end-effector, while maintaining the end-effector within the threshold. The may include the processor registering a swipe input.

The display may be a stereo display.

The end-effector may be a stylus.

The processor, display, and sensor may be disposed on a wearable device. The processor, display, and sensor may be disposed on a head mounted display.

In another embodiment of the present disclosure, a head mounted display is provided that includes a body adapted to be worn on a head of a user. A processor is engaged with the body, the processor being adapted to generate a stereo three dimensional interface and at least one virtual object therein, to define a stimulus of the virtual object in the interface, to define a response to the stimulus, and to execute the response. The apparatus includes first and second displays in communication with the processor, the displays being adapted to output the stereo three dimensional interface and the virtual object, the displays being engaged with the body such that that the displays are disposed proximate and substantially aligned with the user's eyes when the user wears the body. The apparatus also includes first and second image sensors in communication with the processor, the sensors being adapted to generate stereo three dimensional images, the sensors being engaged with the body such that the field of view of the sensors includes a region in front of the user when the body is worn by the user, the sensors being adapted to detect the stimulus. The stimulus includes approaching the virtual object with an end-effector to within a threshold.

In another embodiment of the present disclosure, an apparatus is provided that includes means for generating a three dimensional interface, means for generating at least one virtual object in the interface, means for defining a stimulus of the interface, means for defining a response to the stimulus, means for sensing the stimulus, and means for registering the response. The stimulus includes approaching the virtual object with an end-effector to within a threshold.

BRIEF DESCRIPTION OF THE SEVERAL VIEWS OF THE DRAWINGS

Like reference numbers generally indicate corresponding elements in the figures.

FIG. 13A through FIG. 13C show an end-effector imparting a swipe input to a virtual object in accordance with the present disclosure.

DETAILED DESCRIPTION OF THE INVENTION

Figure 1:
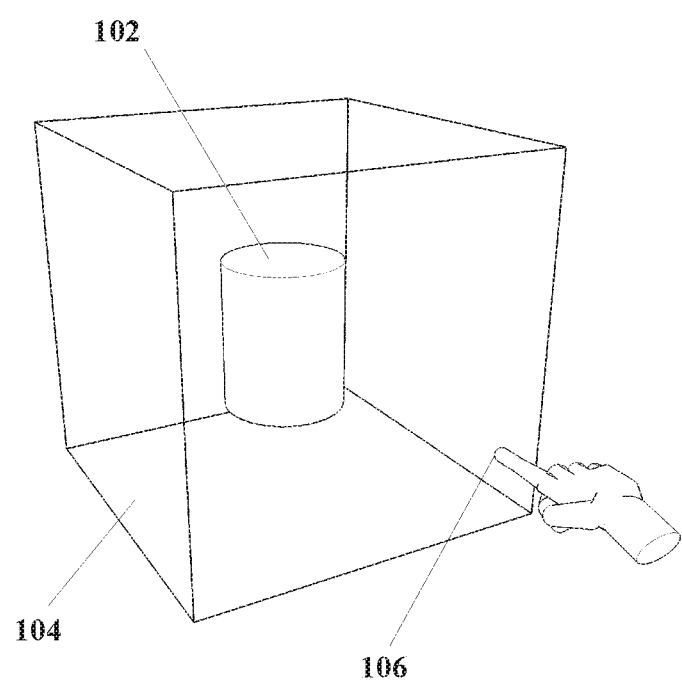
FIG. 1 shows an embodiment of a three dimensional interface in accordance with the present disclosure.

Referring to FIG. 1, a virtual object 102 for a three dimensional interface in accordance with the present disclosure is shown. FIG. 1 also shows a threshold 104 defined with respect to the virtual object 102.

For simplicity, FIG. 1 includes only one virtual object 102, but in practice the number of virtual objects 102 is not particularly limited; a three dimensional interface in accordance with the present disclosure may include any number of virtual objects 102. The number of virtual objects 102 may also vary over time for a given interface. For example, virtual objects may be added, moved, deleted, etc. by the user, the operating system, and/or other agencies.

The present disclosure also is not particularly constrained with respect to the type of virtual objects 102 that may be incorporated into the interface. For simplicity, the virtual objects 102 illustrated in FIG. 1 is shown as a geometric shape, specifically a cylinder. However, graphical icons, still images, animations, constructs of fixed and moving subcomponents, and other entities may also be suitable. In addition, the term "virtual object" as used herein may encompass entities that might not be considered to be objects in a strict sense if such "objects" were physical, e.g. light sources, puffs of virtual smoke, cascading streams of virtual water, etc. Virtual objects may be opaque, translucent, or transparent, or some combination thereof. Virtual objects may include auditory and/or other sensory information as well. The term "virtual object" as used herein should be taken to represent any virtual construct that can be represented to a user within the interface.

In particular, it is noted that a virtual object 102 within the three dimensional interface may be three dimensional. However, this is not required; while the virtual object 102 in FIG. 1 is shown as a three dimensional object, virtual objects 102 with other numbers of dimensions (including but not limited to two dimensions) may be equally suitable. Virtual objects 102 are not particularly limited with regard to the number of dimensions they exhibit.

With regard to the threshold 104 defined with respect to the virtual object 102, typically, though not necessarily, the threshold is invisible to the user. However, the threshold 104 is depicted visually (e.g. as a wireframe) in FIG. 1 and elsewhere herein for clarity.

It is noted that virtual objects 102 and thresholds 104 may be, and typically are, entirely non-physical. That is, virtual objects 102 and thresholds 104 are not required to have physical substance in and of themselves. Virtual objects 102 and/or thresholds 104 may be output so as to appear in free space, that is, so as not to overlap with or contact physical objects and/or structures in the physical world (though such contact and/or overlapping is not excluded). Likewise, virtual objects 102 and/or associated thresholds 104 are not required to be physically supported by objects, surfaces, and/or forces in the physical world, nor do virtual objects 102 or thresholds 104 necessarily correspond to physical objects and/or surfaces in the physical world. Although a three dimensional interface in accordance with the present disclosure may or may not be output in such a way as to appear to occupy a volume that also contains physical objects, structures, etc., virtual objects 102 and/or thresholds 104 therein are not required to be associated with physical objects.

In addition. FIG. 1 shows an end-effector 106. The end-effector 106 is not necessarily part of the interface per se; rather, the end-effector 106 is an agent that manipulates and/or interacts with virtual objects 102 and/or associated thresholds 104.

As used herein the term end-effector refers to an entity used for manipulation; often though not exclusively the manipulation is based on the position, orientation, and/or configuration of an end or point of that entity. As illustrated in FIG. 1, the end-effector 106 is a finger of a user's hand. A fingertip is a convenient end-effector 106 for certain embodiments of the present disclosure. However, other end-effectors, including but not limited to a stylus, mouse, etc. or even ad hoc end-effectors such as pens, pencils, water bottles, etc. may be used to interact with the interface and/or the virtual objects 102 therein in some embodiments. In addition, it is noted that end-effectors are not limited only to solid objects, or to real-world entities. For example, for some embodiments a light beam may be a suitable end-effector. For other embodiments, a virtual construct, object, or effect may be a suitable end-effector.

Figure 2:
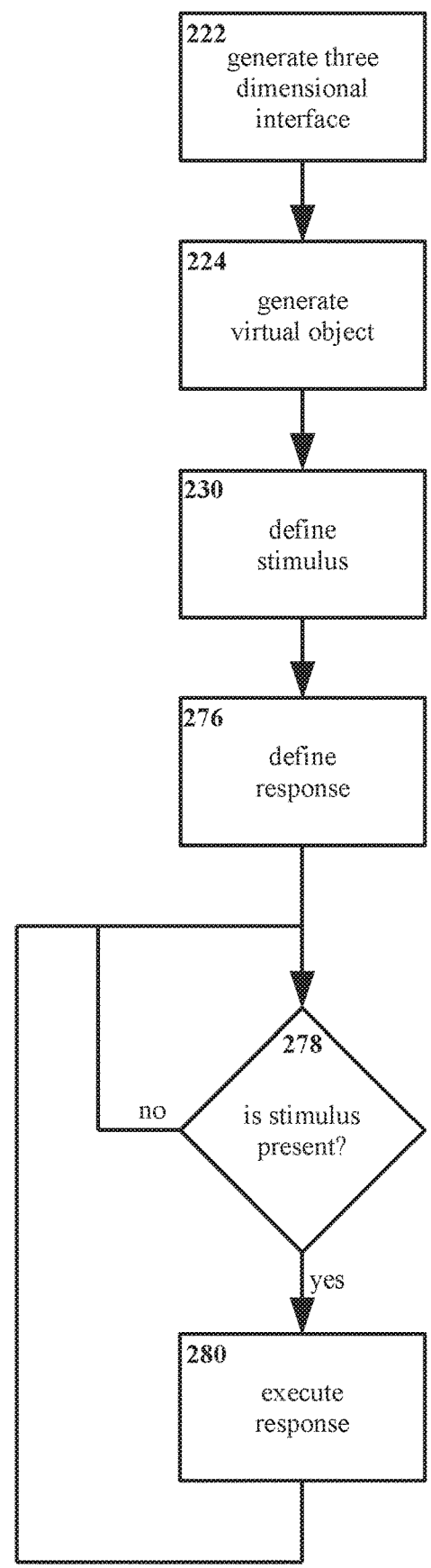
FIG. 2 shows an embodiment of a method for interacting with a three dimensional interface in accordance with the present disclosure.

Turning to FIG. 2, a method is shown therein for interacting with a three dimensional interface in accordance with the present disclosure. The steps shown in FIG. 2 may be implemented through the use of executable instructions on a processing system, however, the present disclosure is not particularly limited insofar as the mechanisms for executing these method steps.

First, a three dimensional interface is generated 222 in a processor. At least one virtual object is also generated 224 within the three dimensional interface.

A stimulus is defined 230 for the virtual object. As will be described in more detail below, the stimulus may be defined in terms of a threshold, e.g. such that the stimulus is applied when some event takes place within the threshold distance of the virtual object. Thus, in some sense the stimulus may be defined as being applied indirectly to the virtual object via the threshold (the threshold being defined with respect to the virtual object), rather than directly to the virtual object. Alternately, the stimulus may be defined 230 as a stimulus applied directly to the virtual object.

A response to the stimulus is also defined 276, such that when the stimulus is present the response is executed. With stimulus and response defined 230 and 276, a determination is made 278 as to whether or not the stimulus is present. That is, is the stimulus as defined 230 being applied to the virtual object? For example, if the stimulus is defined in terms of an approach to within a threshold of the virtual object, has some agency approached to within the threshold?

If the stimulus is determined 278 to be present, the response is executed 280. The response having been executed 280, the method repeats the determination 278. If the stimulus is determined 278 not to be present, the method repeats the determination 278.

Typically, though not necessarily, the stimulus may be defined as an approach of some agency to a virtual object, possibly including contact with the virtual object. In such instance, the stimulus may also be defined as an approach by some agency to within a threshold of the virtual object.

It is noted that as described with respect to the example embodiments presented herein, the stimulus may be defined so as to include a gesture and/or a posture using one or more fingers of a users hand, and/or other end-effectors. Thus, the stimulus may itself be considered, for at least some embodiments, to be a gesture, and/or a gesture input. For example, with regard to touch, click, double click, peg, scale, and/or swipe inputs (described later herein with respect to individual example embodiments) as registered by the controlling system, the postures and/or gestures defined as stimuli for generating responses including touch, click, double click, peg, scale, and/or swipe inputs may be considered to themselves be touch gestures, click gestures, double click gestures, peg gestures, scale gestures, and swipe gestures. However, these are examples only, and other gestures and related inputs and stimuli may be equally suitable.

The response may be defined 276 in many ways. For example, the response may be defined 276 such that executing the response 280 constitutes sending an instruction to and/or executing an instruction within the system controlling or associated with the three dimensional interface. For example, the response may be defined 276 such that executing the response 280 causes the system to register a "touch" input; that is, the system acknowledges that the virtual object in question has been touched by an end-effector. Such an event may, for example, constitute input from a user to the system, and thus to the three dimensional interface.

It is noted that executing the response 280 may or may not have any immediate and visible effect so far as the user is concerned. To continue the example above, there may or may not be any obvious visible effect of registering a touch input (though registering the touch input may nevertheless affect the system, the three dimensional interface, the virtual object, etc. in a fashion that is significant but not immediately visible). However, certain responses may produce visible or otherwise obvious effects. For example, registering a touch input to a virtual object may prompt the system to highlight that virtual object, to change the color, shape, orientation, etc. of the virtual object, or to make other noticeable changes.

Typically, though not necessarily, a response may be defined 276 that is specific to a stimulus. That is, a particular stimulus may be associated with a particular response. An object may likewise have multiple stimuli defined, each with a response specific to one stimulus.

A threshold also may be defined in various ways. Referring again to FIG. 1, the threshold 104 shown therein is defined as a simple geometric shape, centered on the virtual object 102. However, this is an example only. Alternately, the threshold 104 may be defined as a distance from the surface of the virtual object 102, a distance from the center of the virtual object 102, or in some other form.

Indeed, the threshold 104 could even be defined with zero distance from the surface of the virtual object 102. i.e. aligned with the visible surface of the virtual object 102; the threshold 104 could also be defined with a negative distance, so as to be inside the surface of the virtual object 102. In such instances, a stimulus might not be considered to be applied to the virtual object 102 until the stimulating agency (e.g. an end-effector, though other arrangements may be suitable) touches or even penetrates within the surface of the virtual object 102.

The threshold 104 may also be defined in terms other than of distance. For example, a threshold 104 might be defined as an angular distance as measured from some point. e.g. a position of a user. Thus, approaching the virtual object 102 to within that angular distance would constitute approaching the virtual object 102 to within the threshold 104.

In addition, the timing and/or manner of defining the threshold 104 for a virtual object 102 may vary. The threshold 104 may be defined for a virtual object 102 under all conditions, for all potential stimuli. However, a threshold 104 may also be specific to a particular stimulus. Thus, for a given stimulus the threshold 104 may be identical for all virtual objects 102 in the three dimensional interface; and/or, for a given virtual object 102 the threshold 104 may be different for different stimuli.

Other arrangements for the threshold 104 may be equally suitable.

Figure 3A:
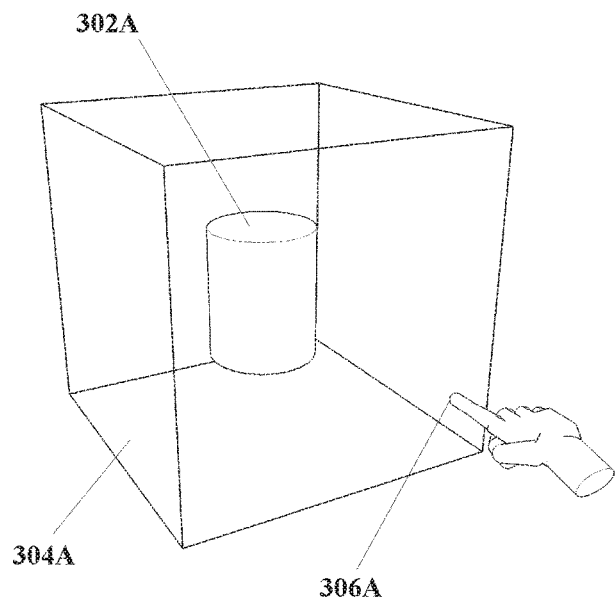
FIG. 3A through FIG. 3D show an end-effector imparting a touch input to a virtual object in accordance with the present disclosure.

FIG. 3A through FIG. 3, show an example of an end-effector imparting a touch stimulus to a virtual object, in accordance with the present disclosure.

In FIG. 3A, a virtual object 302A is shown, with a threshold defined 304A in the form of a cube substantially centered on the virtual object 302A. An end-effector 306A is illustrated in the form of a finger of a user's hand, but the end-effector 306A is some distance from the virtual object 302A, and in particular the end-effector 306A is not within the threshold 304A.

Figure 3B:
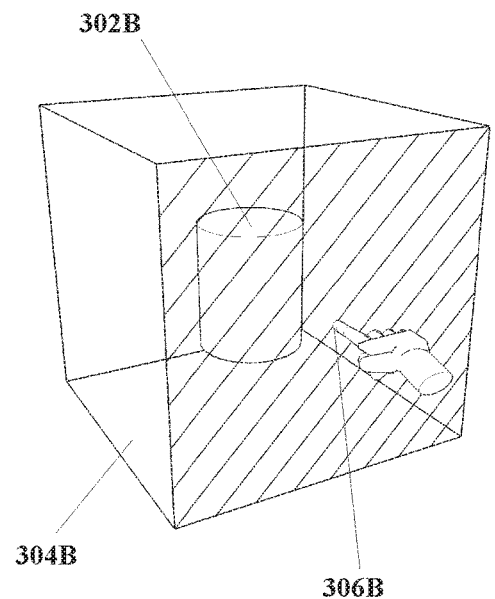

In FIG. 3B, the end-effector 306B has approached the virtual object 302B to within the threshold 304B. As illustrated, the end-effector 306B has reached the threshold 304B. The face of the threshold 304B that the end-effector 306B has reached is highlighted with diagonal hatching to indicate for purposes of clarity that the end-effector 306B has approached the virtual object 302B to within the threshold 304B. However, as noted elsewhere, in practice the threshold 304B may not be visible (though a visible threshold 304B is not excluded).

Given an arrangement, for example, wherein the stimulus for the virtual object 302B is defined as an end-effector 306B approaching the virtual object 302B to within the threshold 304B, in the arrangement of FIG. 3B the stimulus can be considered to have been delivered. The defined response to that stimulus is then executed.

For the arrangement shown in FIG. 3A and FIG. 3B, one possible response would be for the system controlling the three dimensional interface to register a "touch" input. That is, since the end-effector 306B has been brought within the threshold 304B of the virtual object 302B, the controlling system would register that the virtual object 302B has now been touched.

The controlling system may then take one or more actions further to registering the touch input. That is, the touch input may "do something" within the system, which may in turn have an effect within the three dimensional interface. However, possible actions that may follow from a touch input may vary considerably. For example, touching a virtual object—that is, applying a suitable stimulus such that the response is a touch input-could be cause for the controlling system to select, indicate, identify, etc. that virtual object. e.g. for further manipulation or interaction. However, such actions are examples only.

Figure 3C:
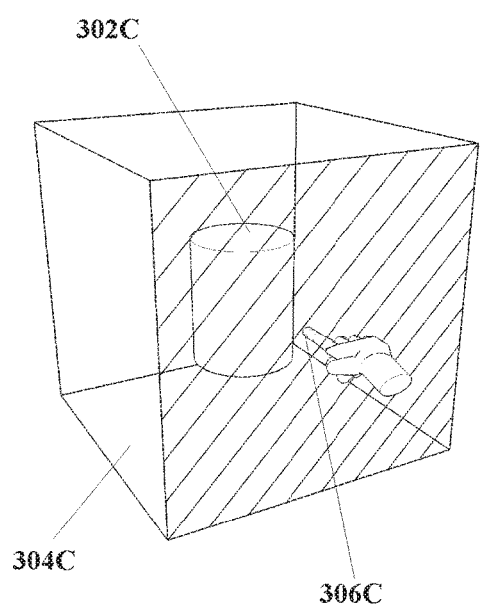
Figure 3D:
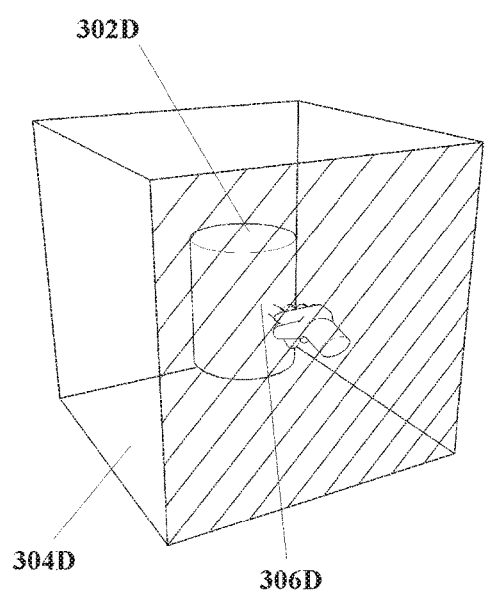

Moving to FIG. 3C and FIG. 3D, arrangements are shown wherein an end-effector 306C and 306D has approached significantly inside the threshold 304C and 304D of a virtual object 302C and 302D, respectively. In the case of FIG. 3C, the end-effector 306C has penetrated into the threshold 304C, while in the case of FIG. 3D the end-effector 306D has penetrated not only the threshold 304D but has also penetrated into the virtual object 302I) itself.

It is to be understood that in both of the instances shown in FIG. 3C and FIG. 3D, the stimulus—in this case, approaching the virtual object 302C and 302D with an end-effector 306C and 306D to within a threshold 304C and 304D, respectively, —is still satisfied. That is, the stimulus and/or threshold 304C and 304D may be so defined (and typically, though not necessarily, is so defined) that approaching closer than the threshold 304C and 304D will constitute applying the stimulus. In other words, typically the stimulus and/or the threshold 304C and 304D are defined so that it is not necessary to approach a virtual object 302C and 302D to a specific or narrowly defined distance; approaching closer may be equally suitable.

Figure 4:
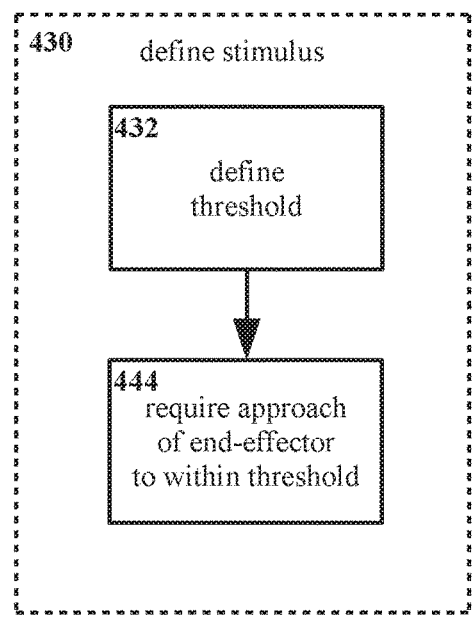
FIG. 4 shows an embodiment of a method for imparting a touch input to a three dimensional interface in accordance with the present disclosure.

Referring now to FIG. 4, a method for defining a stimulus 430 is shown therein. As noted previously with regard to FIG. 2, defining a stimulus may itself be a step in a method (as shown in FIG. 2) for interacting with a three dimensional interface in accordance with the present disclosure. In FIG. 4, an example of a step of defining a stimulus 430 in accordance with the present disclosure is further illustrated in terms of sub-steps; the sub-steps for defining a stimulus 430 in FIG. 4 correspond approximately with the interactions illustrated in FIG. 3A through FIG. 3D.

As shown in FIG. 4, in defining a stimulus 430 to a virtual object, a threshold for that virtual object may also be defined 432. As has been described earlier, the threshold may be defined in a variety of ways. In addition, as has also been described earlier, defining the threshold 432 as part of defining the stimulus 430 is an example only; it may be equally suitable, for example, to define the threshold as part of generating the virtual object, instead, and other arrangements may also be equally suitable.

In addition, defining the stimulus 430 may include requiring an end-effector to approach within the threshold 444 of the virtual object. That is, the stimulus itself would be defined 430 (at least partially) as an end-effector approaching a virtual object to within the threshold 444. It is noted that the arrangement shown in FIG. 4 corresponds approximately with a "touch" input as described with regard to FIG. 3A through FIG. 3D.

It is emphasized that the method for defining a stimulus 430 as shown in FIG. 4 is an example only, and that other arrangements may be equally suitable.

Figure 5A:
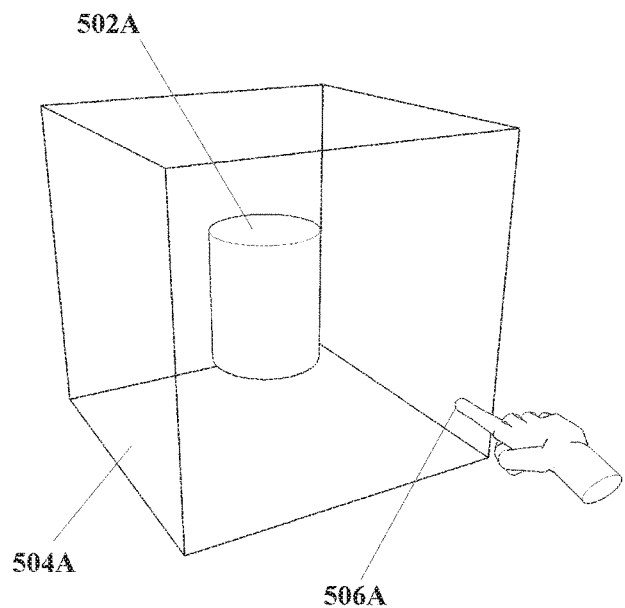
FIG. 5A through FIG. 5C show an end-effector imparting a click input to a virtual object in accordance with the present disclosure.
Figure 5B:
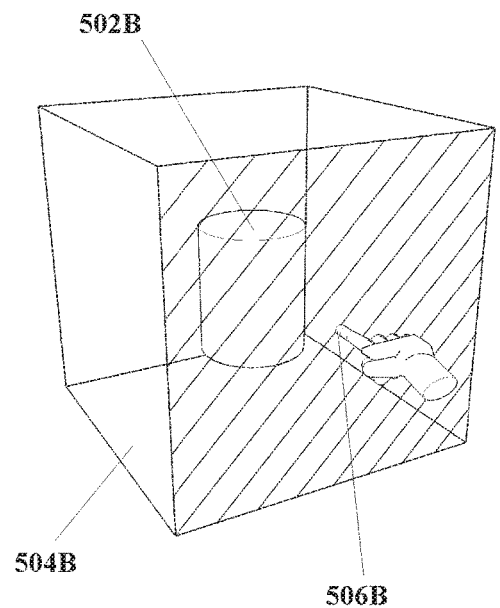
Figure 5C:
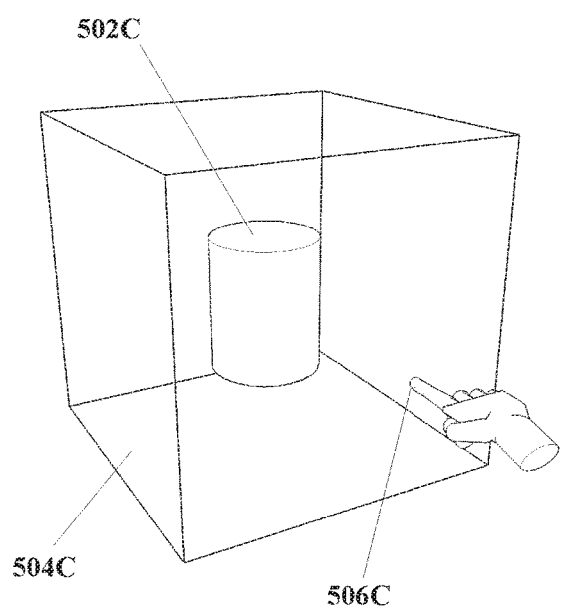

Turning to FIG. 5A through FIG. 5C, show an example of an end-effector imparting a single click stimulus to a virtual object, in accordance with the present disclosure.

In FIG. 5A, a virtual object 502A is shown, with a threshold defined 504A in the form of a cube substantially centered on the virtual object 502A. An end-effector 506A is illustrated in the form of a finger of a user's hand, but the end-effector 506A is some distance from the virtual object 502A, and in particular the end-effector 506A is not within the threshold 504A.

In FIG. 5B, the end-effector 506B has approached the virtual object 502B to within the threshold 504B. As illustrated, the end-effector 506B has reached the threshold 504B. The face of the threshold 504B that the end-effector 506B has reached is highlighted with diagonal hatching to indicate for purposes of clarity that the end-effector 506B has approached the virtual object 502B to within the threshold 504B. However, as noted elsewhere, in practice the threshold 504B may not be visible (though a visible threshold 504B is not excluded).

In FIG. 5C, the end-effector 506C has withdrawn from the virtual object 502C beyond the threshold 504C. The diagonal hatching formerly highlighting a face of the threshold 504C is now absent to indicate for purposes of clarity that the end-effector 506C has withdrawn from the virtual object 502C beyond the threshold 504C.

Given an arrangement, for example, wherein the stimulus for the virtual object 502C is defined as an end-effector 506C approaching the virtual object 502C to within the threshold 504C and then withdrawing from the virtual object 502C beyond the threshold 504C, in the arrangement of FIG. 5C the stimulus can be considered to have been delivered. The defined response to that stimulus is then executed.

However, it is noted that for some embodiments the stimulus may include other criteria beyond those visually depicted in FIG. 5A through FIG. 5C; for example, a first time interval may be defined, such that the end-effector 506C must withdraw from the virtual object 502C beyond the threshold 504C within the first time interval. That is, if the end-effector were to remain within the threshold for longer than the first time interval, the stimulus might not be considered to have been delivered.

For the arrangement shown in FIG. 5A through FIG. 5C, one possible response would be for the system controlling the three dimensional interface to register a "click" or "single click" input. That is, since the end-effector 506A through 506C has been brought within the threshold 504A through 504C of the virtual object 502A through 502C, and the end-effector 506A through 506C has within the first interval been withdrawn from the virtual object 502A through 502C beyond the threshold 504A through 504C of the virtual object 502A through 502C, the controlling system would register that the virtual object 502A through 502C has now been clicked or single clicked As described previously, the controlling system may then take one or more actions further to registering the stimulus.

That is, the click input may "do something" within the system, which may in turn have an effect within the three dimensional interface. However, possible actions that may follow from a touch input may vary considerably. For example, clicking a virtual object—that is, applying a suitable stimulus such that the response is a click input-could be cause for the controlling system to wake, activate, highlight. etc. the virtual object (or some feature or function associated with the virtual object). However, such actions are examples only.

Figure 6:
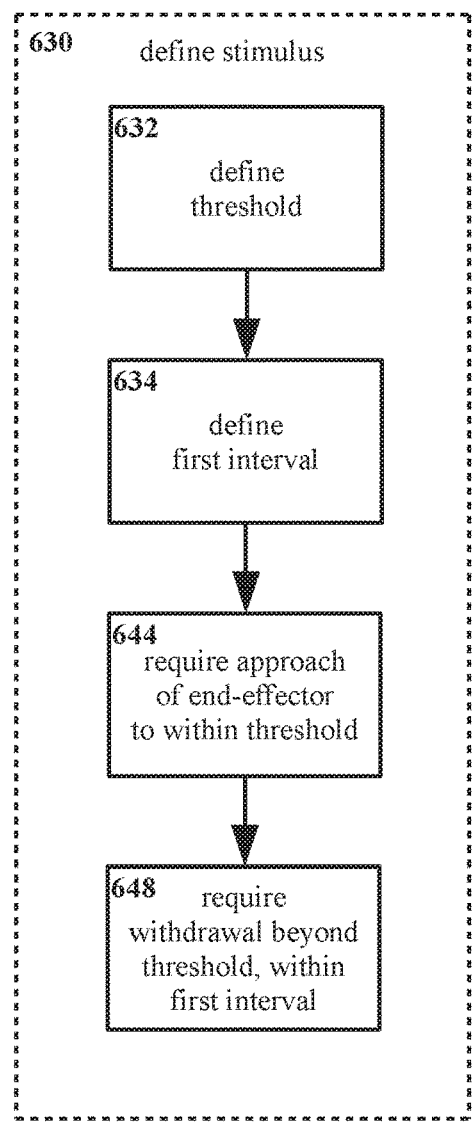
FIG. 6 shows an embodiment of a method for imparting a click input to a three dimensional interface in accordance with the present disclosure.

Referring now to FIG. 6, a method for defining a stimulus 630 is shown therein. As noted previously, defining a stimulus may itself be a step in a method for interacting with a three dimensional interface in accordance with the present disclosure. In FIG. 6, an example of a step of defining a stimulus 630 in accordance with the present disclosure is further illustrated in terms of sub-steps; the sub-steps for defining a stimulus 630 in FIG. 6 correspond approximately with the interactions illustrated in FIG. 5A through FIG. 5C.

As shown in FIG. 6, in defining a stimulus 630 to a virtual object, a threshold for that virtual object may also be defined 632. As has been described earlier, the threshold may be defined in a variety of ways. In addition, as has also been described earlier, defining the threshold 632 as part of defining the stimulus 630 is an example only; it may be equally suitable, for example, to define the threshold as part of generating the virtual object, instead, and other arrangements may also be equally suitable.

Defining the stimulus 630 may include defining a first interval of time 634. For some stimuli, for example, it may be required or at least useful for stimuli to be defined 630 at least in part in terms of the timing of an action or action. For example, it might be required that after one step takes place, a later step must take place within a certain period of time.

In addition, defining the stimulus 630 may include requiring an end-effector to approach within the threshold 644 of the virtual object. That is, the stimulus itself would be defined 630 (at least partially) as an end-effector approaching a virtual object to within the threshold 644.

Likewise, defining the stimulus 630 may include requiring the end-effector to withdraw beyond the threshold 648. As noted above, additional requirements such as timing may be imposed, e.g. the end-effector may be required to withdraw beyond the threshold 648 of a virtual object within a first time interval (the first time interval having been defined in step 634).

It is noted that the arrangement shown in FIG. 6—approach of an end-effector to within a threshold of a virtual object 644, and withdrawal of the end-effector from the virtual object beyond the threshold within a first interval 648—corresponds approximately with a "click" or "single click" input as described with regard to FIG. 5A through FIG. 5C.

It is emphasized that the method for defining a stimulus 630 as shown in FIG. 6 is an example only, and that other arrangements may be equally suitable.

Turning to FIG. 7A through FIG. 7E, an example is shown therein of an end-effector imparting a double click stimulus to a virtual object in accordance with the present disclosure.

Figure 7A:
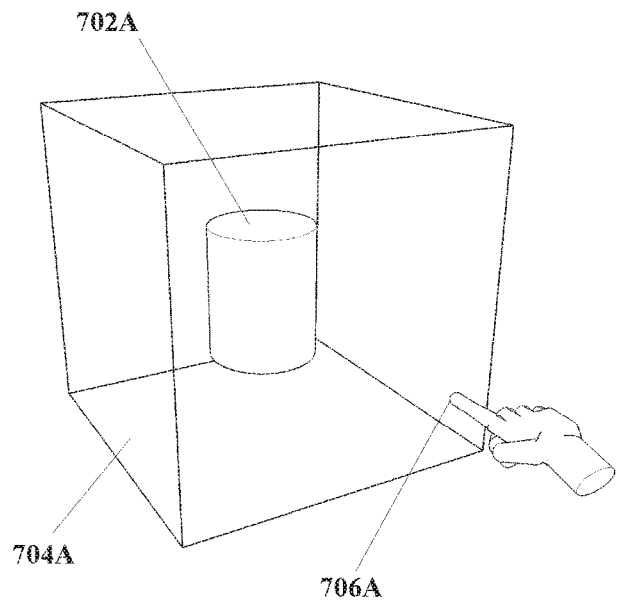
FIG. 7A through FIG. 7E show an end-effector imparting a double-click input to a virtual object in accordance with the present disclosure.

In FIG. 7A, a virtual object 702A is shown, with a threshold defined 704A in the form of a cube substantially centered on the virtual object 702A. An end-effector 706A is illustrated in the form of a finger of a user's hand, but the end-effector 706A is some distance from the virtual object 702A, and in particular the end-effector 706A is not within the threshold 704A.

Figure 7B:
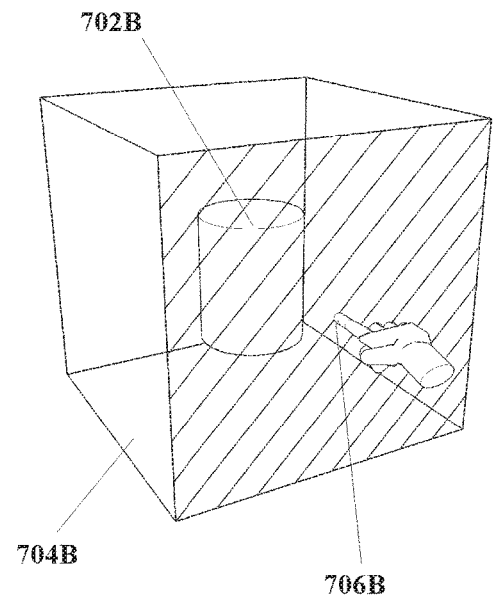

In FIG. 7B, the end-effector 706B has approached the virtual object 702B to within the threshold 704B. As illustrated, the end-effector 706B has reached the threshold 704B. The face of the threshold 704B that the end-effector 706B has reached is highlighted with diagonal hatching to indicate for purposes of clarity that the end-effector 706B has approached the virtual object 702B to within the threshold 704B. However, as noted elsewhere, in practice the threshold 704B may not be visible (though a visible threshold 704B is not excluded).

Figure 7C:
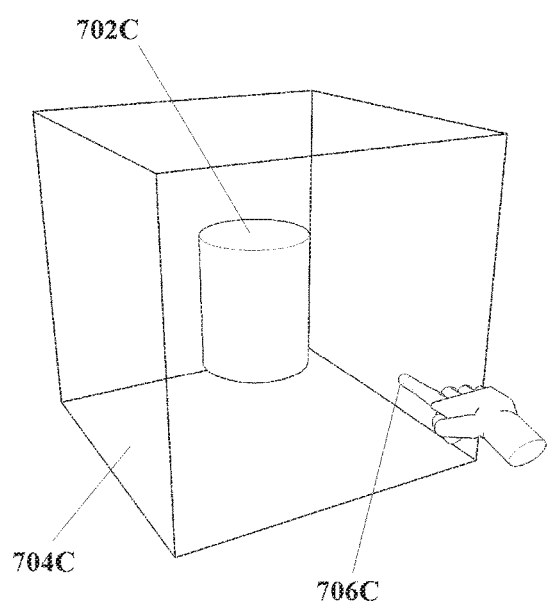
Figure 7D:
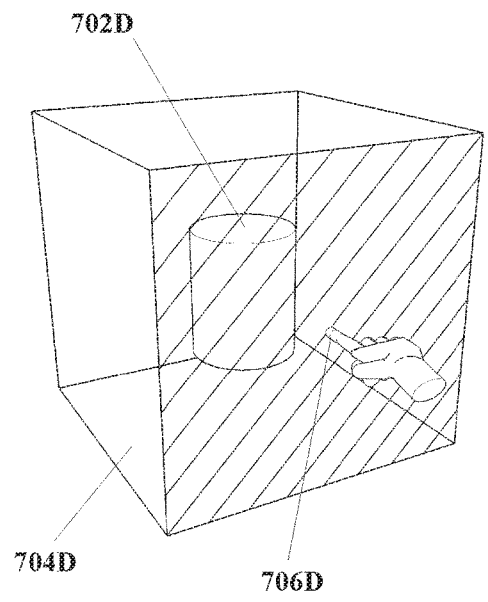

In FIG. 7C, the end-effector 706C has withdrawn from the virtual object 702C beyond the threshold 704C. The diagonal hatching formerly highlighting a face of the threshold 704C is now absent to indicate for purposes of clarity that the end-effector 706C has withdrawn from the virtual object 702C beyond the threshold 704C.

In FIG. 71), the end-effector 706D has again approached the virtual object 702D to within the threshold 704D. The face of the threshold 704D that the end-effector 706D has reached is again highlighted.

Figure 7E:
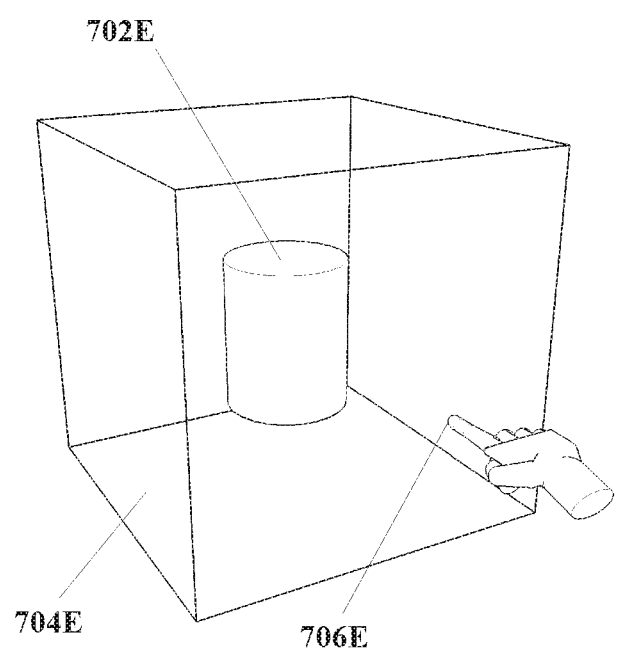

In FIG. 7E, the end-effector 706E has again withdrawn from the virtual object 702E beyond the threshold 704E. The diagonal hatching formerly highlighting a face of the threshold 704E is now again absent.

Given an arrangement, for example, wherein the stimulus for the virtual object 702E is defined as an end-effector 706E approaching the virtual object 702E to within the threshold 704E and then withdrawing from the virtual object 702E beyond the threshold 704E, followed by the end-effector 706E again approaching the virtual object 702E to within the threshold 704E and then again withdrawing from the virtual object 702E beyond the threshold 704E, in the arrangement of FIG. 7E the stimulus can be considered to have been delivered. The defined response to that stimulus is then executed.

However, it is noted that for some embodiments the stimulus may include other criteria beyond those visually depicted in FIG. 7A through FIG. 7E; for example, a first time interval may be defined, such that the end-effector 706C and 706E must withdraw from the virtual object 702C and 702E beyond the threshold 704C and 704E within the first time interval. That is, if the end-effector were to remain within the threshold for longer than the first time interval, the stimulus might not be considered to have been delivered. Similarly, a second time interval may be defined, such that the end-effector 706D must re-approach the virtual object 702D to within the threshold 704D within the second time interval. That is, if after first approaching the threshold, the end-effector were to remain outside the threshold for longer than the second time interval, the stimulus might not be considered to have been delivered.

For the arrangement shown in FIG. 7A through FIG. 7E, one possible response would be for the system controlling the three dimensional interface to register a "double click" input. That is, since the end-effector 706A through 706E has been brought within the threshold 704A through 704E of the virtual object 702A through 702E, and the end-effector 706A through 706E has within the first interval been withdrawn from the virtual object 702A through 702E beyond the threshold 704A through 704E of the virtual object 702A through 702E, twice in succession within the second interval, the controlling system would register that the virtual object 702A through 702E has now been double clicked.

As described previously, the controlling system may then take one or more actions further to registering the stimulus. That is, the double click input may "do something" within the system, which may in turn have an effect within the three dimensional interface. However, possible actions that may follow from a touch input may vary considerably. For example, double clicking a virtual object—that is, applying a suitable stimulus such that the response is a double click input-could be cause for the controlling system to open, run, execute, etc. the virtual object (or some feature or function associated with the virtual object). However, such actions are examples only.

Figure 8:
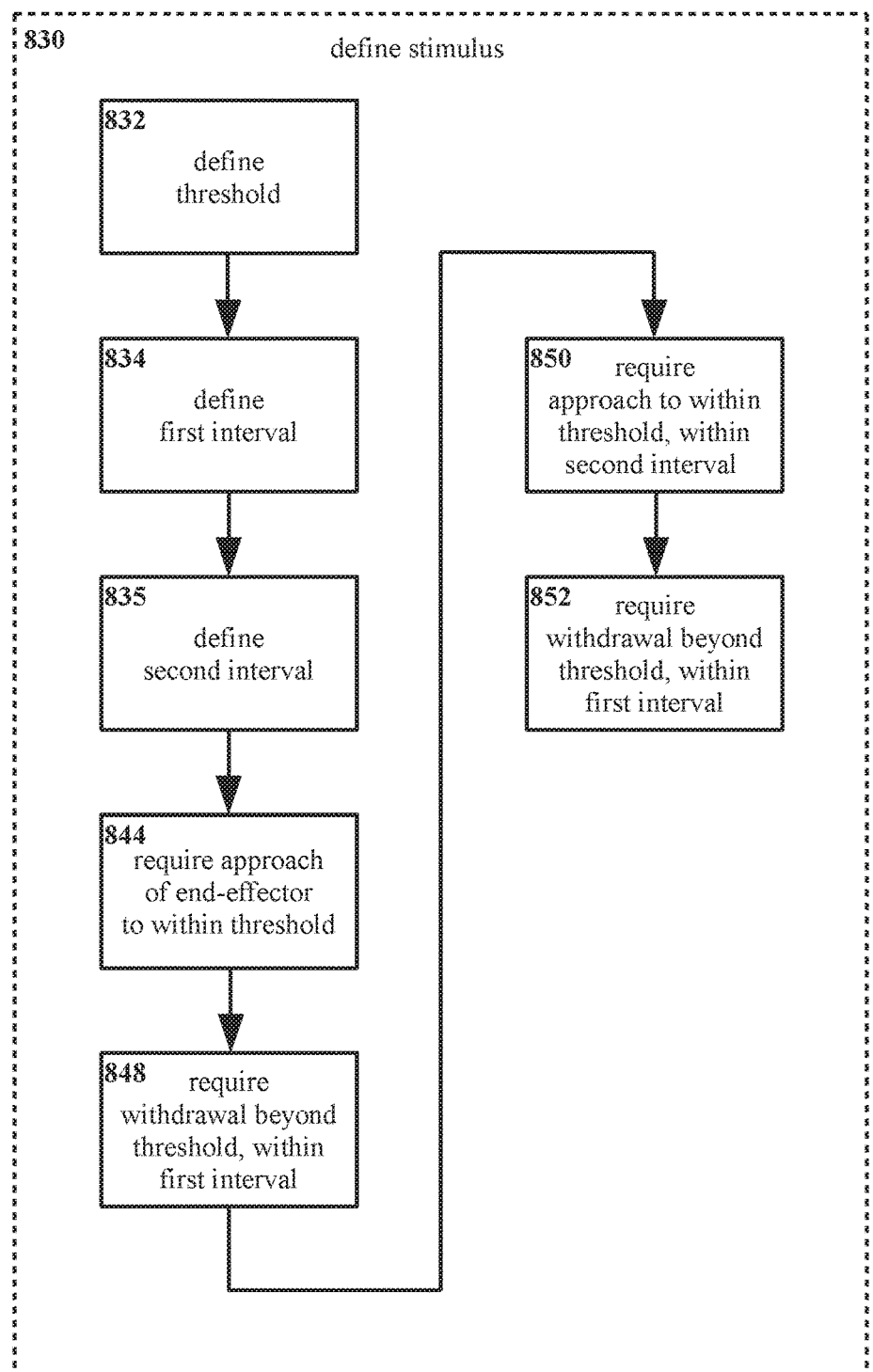
FIG. 8 shows an embodiment of a method for imparting a double click input to a three dimensional interface in accordance with the present disclosure.

Referring now to FIG. 8, a method for defining a stimulus 830 is shown therein. As noted previously with regard to FIG. 2, defining a stimulus may itself be a step in a method (as shown in FIG. 2) for interacting with a three dimensional interface in accordance with the present disclosure. In FIG. 8, an example of a step of defining a stimulus 830 in accordance with the present disclosure is further illustrated in terms of sub-steps; the sub-steps for defining a stimulus 830 in FIG. 8 correspond approximately with the interactions illustrated in FIG. 7A through FIG. 7E.

As shown in FIG. 8, in defining a stimulus 830 to a virtual object, a threshold for that virtual object may also be defined 832. As has been described earlier, the threshold may be defined in a variety of ways. In addition, as has also been described earlier, defining the threshold 832 as part of defining the stimulus 830 is an example only; it may be equally suitable, for example, to define the threshold as part of generating the virtual object, instead, and other arrangements may also be equally suitable.

Defining the stimulus 830 may include defining intervals of time. For some stimuli, for example, it may be required or at least useful for stimuli to be defined 830 at least in part in terms of the timing of an action or actions. For example, it might be required that after one step takes place, a later step must take place within a certain period of time. For the arrangement shown in FIG. 8, a first interval is defined 834, and a second interval is defined 836.

In addition, defining the stimulus 830 may include motions of and/or other actions with an end-effector, e.g. relative to a virtual object and/or a threshold thereof.

For the example of FIG. 8, defining the stimulus 830 includes requiring an end-effector to approach within the threshold 844 of the virtual object. Defining the stimulus 830 also includes requiring withdrawal of the end-effector from the virtual object beyond the threshold within the first time interval 848. Defining the stimulus further includes requiring the end-effector to again approach within the threshold 850 of the virtual object within the second time interval 852, and requiring the end-effector to again withdraw from the virtual object beyond the threshold again within the first time interval 852.

It is noted that for the example in FIG. 8, the first time interval refers to a period of time from the end-effector approaching the virtual object to within a threshold 844 or 850, to the end-effector withdrawing from the virtual object beyond the threshold 848 or 852. That is, it is necessary to perform step 848 within the first time interval after having performed step 844; likewise it is necessary to perform step 850 within the first time interval after having performed step 852. However, it is not necessary to perform (for example) step 852 within the first time interval of having performed step 844; the first time interval applies independently to each pair of steps 844 with 848, and 850 with 852.

Similarly, the second time interval refers to a period of time from the end-effector withdrawing from the virtual object beyond the threshold 848, to the end-effector again approaching the virtual object to within the threshold or 850. It is necessary to perform step 850 within the second time interval after having performed step 848, but it is not necessary to perform (for example) step 852 within the second time interval after having performed step 848.

It is noted that the arrangement shown in FIG. 8—approach of an end-effector to within a threshold of a virtual object 844, withdrawal of the virtual object beyond the threshold within a first interval 848, re-approach of the end-effector to within the threshold of the virtual object within a second interval 850, and re-withdrawal of the end-effector beyond the threshold within another first interval 852—corresponds approximately with a "double click" input as described with regard to FIG. 7A through FIG. 7E.

It is emphasized that the method for defining a stimulus 830 as shown in FIG. 8 is an example only, and that other arrangements may be equally suitable.

Figure 9A:
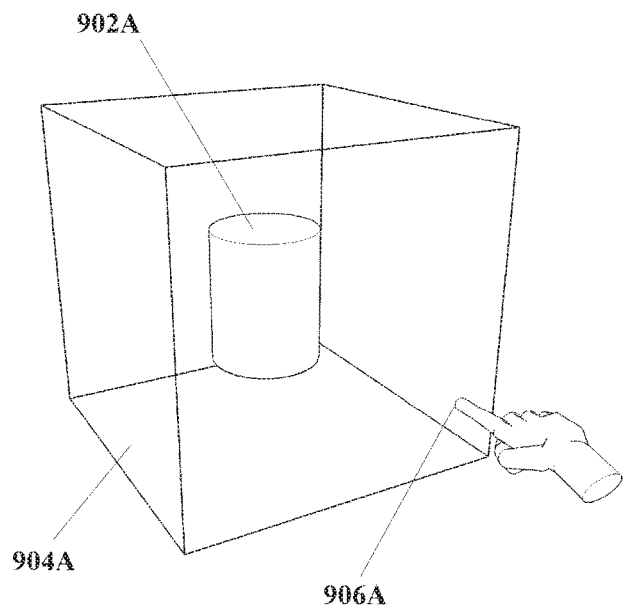
FIG. 9A and FIG. 9B show an end-effector imparting a peg input to a virtual object in accordance with the present disclosure.
Figure 9B:
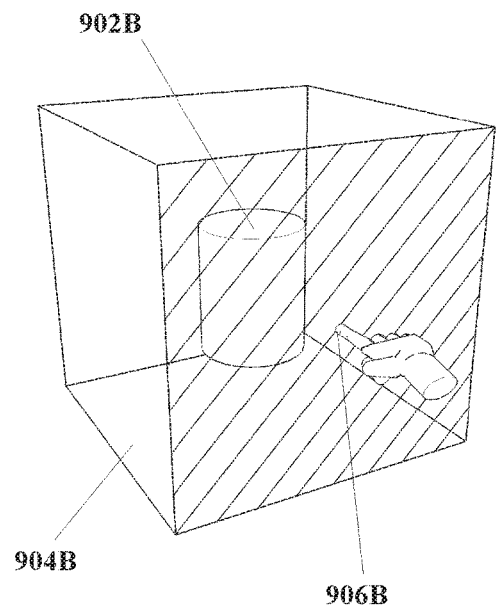

Referring now to FIG. 9A and FIG. 9B, an example is shown therein of end-effectors imparting a peg stimulus to a virtual object in accordance with the present disclosure.

In FIG. 9A, a virtual object 902A is shown, with a threshold defined 904A in the form of a cube substantially centered on the virtual object 902A. An end-effector 906A is illustrated in the form of a finger of a user's hand, but the end-effector 906A is some distance from the virtual object 1002A, and in particular the end-effector 906A is not within the threshold 904A.

In FIG. 9B, the end-effector 906B has approached the virtual object 902B to within the threshold 904B. As illustrated, the end-effector 906B has reached the threshold 904B. The face of the threshold 904B that the end-effector 906B has reached is highlighted with diagonal hatching to indicate for purposes of clarity that the end-effector 906B has approached the virtual object 902B to within the threshold 904B. However, as noted elsewhere, in practice the threshold 904B may not be visible (though a visible threshold 904B is not excluded).

Given an arrangement, for example, wherein the stimulus for the virtual object 902B is defined as an end-effector 906B approaching the virtual object 902B to within the threshold 1004B, in the arrangement of FIG. 9B the stimulus can be considered to have been delivered. The defined response to that stimulus is then executed.

However, for some embodiments the stimulus may include other criteria beyond those visually depicted in FIG. 9A and FIG. 9B. For example, a third time interval may be defined, such that the end-effector 906B must remain within the threshold 904B of the virtual object 902B for at least the duration of the third time interval. That is, if the end-effector were to withdraw beyond the threshold before the first time interval has elapsed, the stimulus might not be considered to have been delivered.

For the arrangement shown in FIG. 9A and FIG. 9B, one possible response would be for the system controlling the three dimensional interface to register a "peg" input. That is, since the end-effector 906A and 906B has been brought within the threshold 904A and 904B of the virtual object 902A and 902B, and the end-effector 906A and 906B has remained within the threshold 904A and 904B of the virtual object 902A and 902B for at least the duration of the third time interval, the controlling system would register that the virtual object 902A and 902B has now been pegged.

As described previously, the controlling system may then take one or more actions further to registering the stimulus. That is, the peg input may "do something" within the system, which may in turn have an effect within the three dimensional interface. However, possible actions that may follow from a touch input may vary considerably. For example, pegging a virtual object—that is, applying a suitable stimulus such that the response is a peg input-could be cause for the controlling system to engage and/or attach the virtual object to the end-effectors applying the peg stimulus, to engage and/or attach some part of and/or location on the virtual object to the end-effector applying the peg stimulus, etc. However, such actions are examples only.

Figure 10:
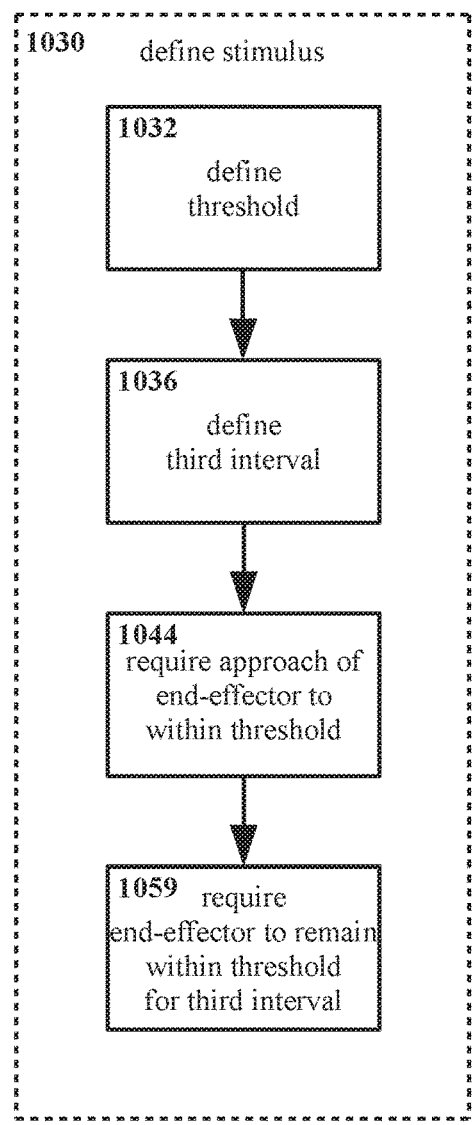
FIG. 10 shows an embodiment of a method for imparting a peg input to a three dimensional interface in accordance with the present disclosure.

Referring now to FIG. 10, a method for defining a stimulus 1030 is shown therein. As noted previously with regard to FIG. 2, defining a stimulus may itself be a step in a method (as shown in FIG. 2) for interacting with a three dimensional interface in accordance with the present disclosure. In FIG. 10, an example of a step of defining a stimulus 1030 in accordance with the present disclosure is further illustrated in terms of sub-steps; the sub-steps for defining a stimulus 1030 in FIG. 10 correspond approximately with the interactions illustrated in FIG. 9A and FIG. 9B.

As shown in FIG. 10, in defining a stimulus 1030 to a virtual object, a threshold for that virtual object may also be defined 1032. As has been described earlier, the threshold may be defined in a variety of ways. In addition, as has also been described earlier, defining the threshold 1032 as part of defining the stimulus 1030 is an example only; it may be equally suitable, for example, to define the threshold as part of generating the virtual object, instead, and other arrangements may also be equally suitable.

Defining the stimulus 1030 may include defining intervals of time. For some stimuli, for example, it may be required or at least useful for stimuli to be defined 1030 at least in part in terms of the timing of an action or actions. For example, it might be required that one step be sustained for a certain time. For the arrangement shown in FIG. 10, a third time interval is defined 1036.

In addition, defining the stimulus 1030 may include motions of and/or other actions with an end-effector. e.g. relative to a virtual object and/or a threshold thereof.

For the example of FIG. 10, defining the stimulus 1030 includes requiring an end-effector to approach within the threshold 1044 of the virtual object. Defining the stimulus 1030 also includes maintaining the end-effector within the threshold of the virtual object for at least the first third interval 1059.

It is noted that the arrangement shown in FIG. 10—approach of an end-effector to within a threshold of a virtual object 1044, and maintaining the end-effector within the threshold of the virtual object for at least the third interval 1059—corresponds approximately with a "peg" input as described with regard to FIG. 9A and FIG. 9B.

It is emphasized that the method for defining a stimulus 1030 as shown in FIG. 10 is an example only, and that other arrangements may be equally suitable.

Figure 11A:
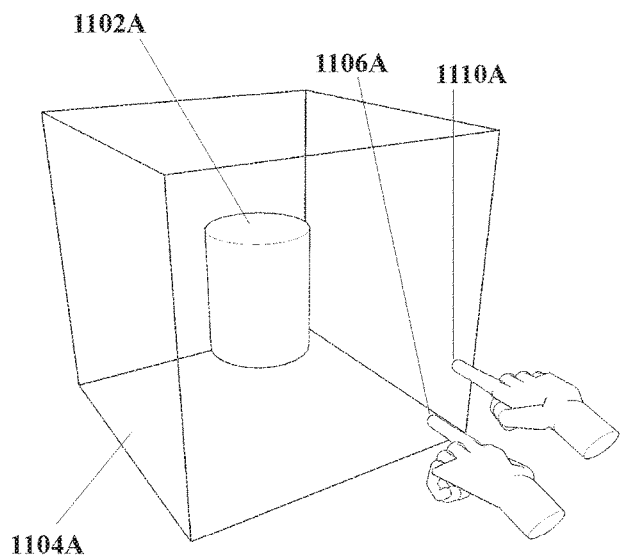
FIG. 11A through FIG. 11C shows end-effectors imparting a scale input to a virtual object in accordance with the present disclosure.
Figure 11B:
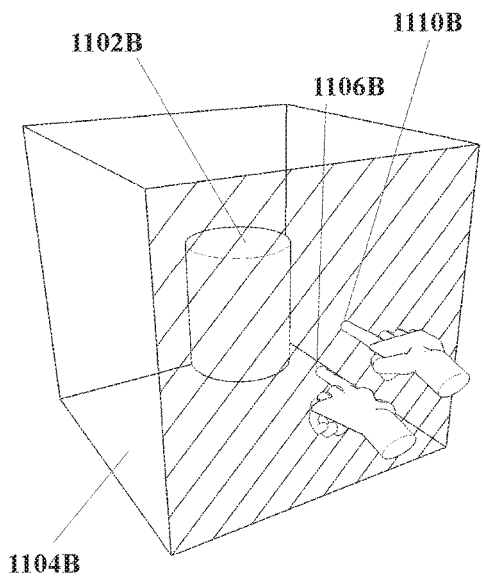
Figure 11C:
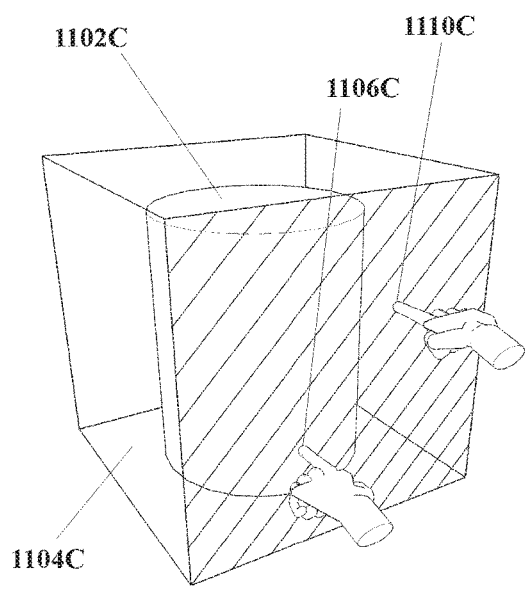

FIG. 11A through FIG. 11C, show an example of end-effectors imparting a scale stimulus to a virtual object in accordance with the present disclosure.

In FIG. 11A, a virtual object 1102A is shown, with a threshold defined 1104A in the form of a cube substantially centered on the virtual object 1102A. A first end-effector 1106A is illustrated in the form of a finger of a user's hand. A third end-effector 1110A is also illustrated in the form of a finger of another hand. The end-effectors 1106A and 110A are some distance from the virtual object 1102A, and in particular the end-effectors 1106A and 110A are not within the threshold 1104A.

In FIG. 11B, the first and third end-effectors 1106B and 110B have approached the virtual object 1102B to within the threshold 1104B. The face of the threshold 1104B that the end-effectors 1106B and 1110B have reached is highlighted with diagonal hatching to indicate for purposes of clarity that the end-effectors 1106B and 1110B have approached the virtual object 1102B to within the threshold 1104B. However, as noted elsewhere, in practice the threshold 1104B may not be visible (though a visible threshold 1104B is not excluded).

In FIG. 11C, the first and third end-effectors 1106B and 110B remain within the threshold 1104C of the virtual object 1102C. However, visible inspection reveals that the distance between the first and third end-effectors 1106B and 1111B has altered from FIG. 11B to FIG. 11C.

Given an arrangement, for example, wherein the stimulus for the virtual object 1102A through 1102C is defined as first and third end-effectors 1106A and 1110A through 1106C and 1110C approaching the virtual object 1102B to within the threshold 1104B, and the distance between the first end-effector 1106A through 106C and the third end-effector 1110A through 110C being altered, in the arrangement of FIG. 11C the stimulus can be considered to have been delivered. The defined response to that stimulus is then executed.

However, for some embodiments the stimulus may include other criteria beyond those visually depicted in FIG. 11A through FIG. 11C. For example, a third time interval may be defined, such that the first and third end-effectors 1106B and 1110B must remain within the threshold 1104B of the virtual object 1102B for at least the duration of the third time interval. That is, if the end-effectors were to withdraw beyond the threshold before the first time interval has elapsed, the stimulus might not be considered to have been delivered.

For the arrangement shown in FIG. 11A through FIG. 11C, one possible response would be for the system controlling the three dimensional interface to register a "scale" input. That is, since the first and third end-effectors 1106A and 1100A through 1106C and 1110C have been brought within the threshold 1104A through 1104C of the virtual object 1102A through 1102C, the first end-effector 1106A through 1106C and the second end-effector 1110A through 1110C have remained within the threshold 1104A and 1104B of the virtual object 1102A and 1102B, respectively, for at least the duration of the third time interval, and the distance between the first end-effector 1106A through 1106C and the third end-effector 110A through 1110C has been altered, the controlling system would register that the virtual object 1102A through 1102C has now been scaled.

As described previously, the controlling system may then take one or more actions further to registering the stimulus. That is, the scale input may "do something" within the system, which may in turn have an effect within the three dimensional interface. However, possible actions that may follow from a touch input may vary considerably. For example, scaling a virtual object—that is, applying a suitable stimulus such that the response is a scale input-could be cause for the controlling system to increase or decrease one or more dimensions of the virtual object, etc. Such an example is illustrated in FIG. 11B and FIG. 1 IC; by visual examination it may be seen that the virtual object 1102C in FIG. 11C is larger than the virtual object 1102B in FIG. 11B. Thus, as illustrated, increasing the distance between the first end-effector 1106A through 1106C and the third end-effector 1110A through 1110C as shown in FIG. 11C results in the controlling processor executing an increase in scale, wherein the magnitude of at least one dimension (as shown, all three dimensions) of the virtual object increases. Decreasing the distance might similarly produce a decrease in scale, wherein the magnitude of at least one dimension of the virtual object decreases. However, such actions are examples only.

Figure 12:
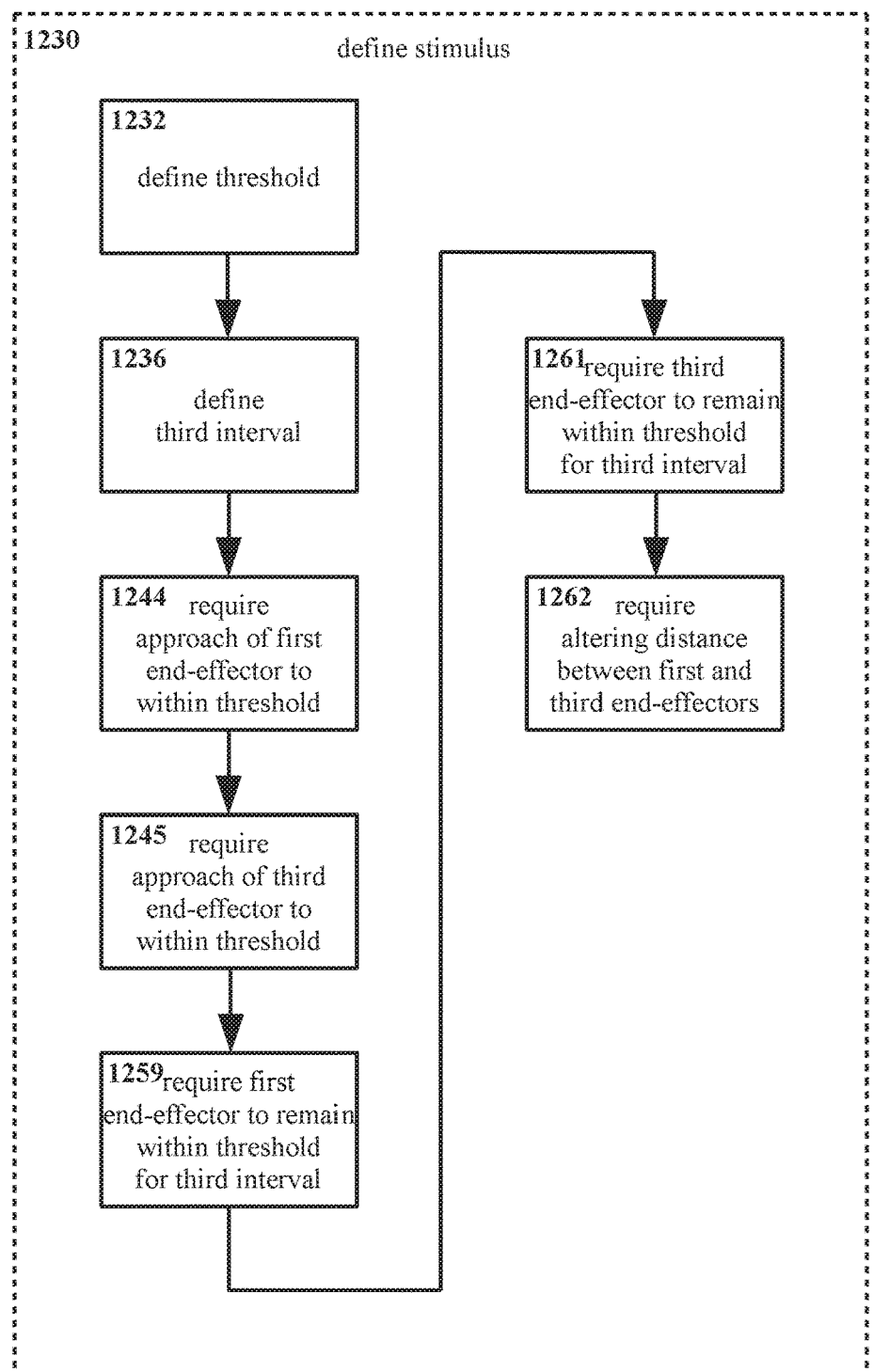
FIG. 12 shows an embodiment of a method for imparting a scale input to a three dimensional interface in accordance with the present disclosure.

Referring now to FIG. 12, a method for defining a stimulus 1230 is shown therein. As noted previously with regard to FIG. 2, defining a stimulus may itself be a step in a method (as shown in FIG. 2) for interacting with a three dimensional interface in accordance with the present disclosure. In FIG. 12, an example of a step of defining a stimulus 1230 in accordance with the present disclosure is further illustrated in terms of sub-steps; the sub-steps for defining a stimulus 1230 in FIG. 12 correspond approximately with the interactions illustrated in FIG. 11A through FIG. 1 IC.

As shown in FIG. 12, in defining a stimulus 1230 to a virtual object, a threshold for that virtual object may also be defined 1232. As has been described earlier, the threshold may be defined in a variety of ways. In addition, as has also been described earlier, defining the threshold 1232 as part of defining the stimulus 1230 is an example only; it may be equally suitable, for example, to define the threshold as part of generating the virtual object, instead, and other arrangements may also be equally suitable.

Defining the stimulus 1230 may include defining intervals of time. For some stimuli, for example, it may be required or at least useful for stimuli to be defined 1230 at least in part in terms of the timing of an action or actions. For example, it might be required that one step be sustained for a certain time. For the arrangement shown in FIG. 12, a third time interval is defined 1236.

In addition, defining the stimulus 1230 may include motions of and/or other actions with an end-effector, e.g. relative to a virtual object and/or a threshold thereof.

For the example of FIG. 12, defining the stimulus 1030 includes requiring a first end-effector to approach within the threshold 1244 of the virtual object, and requiring a third end-effector to approach within the threshold 1245 of the virtual object. Defining the stimulus 1230 also includes maintaining the first end-effector within the threshold of the virtual object for at least the first third interval 1259, and maintaining the third end-effector within the threshold of the virtual object for at least the first third interval 1261.

Further, defining the stimulus 1230 includes requiring an altering of the distance between the first and third end-effectors 1262.

It is noted that the arrangement shown in FIG. 12—approach of first and third end-effectors to within a threshold of a virtual object 1244 and 1245, maintaining the first and third end-effectors within the threshold of the virtual object for at least the duration of the third interval 1259 and 1261, and altering the spacing between the first and third end-effectors 1262—corresponds approximately with a "scale" input as described with regard to FIG. 11A through FIG. 11C.

It is emphasized that the method for defining a stimulus 1230 as shown in FIG. 12 is an example only, and that other arrangements may be equally suitable.

FIG. 13A through FIG. 13C, show an example of an end-effector imparting a swipe stimulus to a virtual object in accordance with the present disclosure.

In FIG. 13A, a virtual object 1302A is shown, with a threshold defined 1304A in the form of a cube substantially centered on the virtual object 1302A. An end-effector 1306A is illustrated in the form of a finger of a user's hand. The end-effector 1306A is some distance from the virtual object 1302A, and in particular the end-effector 1306A is not within the threshold 1304A.

In FIG. 13B, the end-effector 1306B has approached the virtual object 1302B to within the threshold 1304B. As illustrated, the end-effector 11306B has reached the threshold 3504B. The face of the threshold 1304B that the end-effector 1306B has reached is highlighted with diagonal hatching to indicate for purposes of clarity that the end-effector 1306B has approached the virtual object 1302B to within the threshold 1304B. However, as noted elsewhere, in practice the threshold 1304B may not be visible (though a visible threshold 1304B is not excluded).

In FIG. 13C, the end-effector 1306C remains within the threshold 1304C of the virtual object 1302C. However, visible inspection reveals that the end-effector 1306C has been translated in its position from FIG. 13B to FIG. 13C.

Given an arrangement, for example, wherein the stimulus for the virtual object 1302A through 1302C is defined as an end-effector 1306A through 1306C approaching the virtual object 1302A through 1302C to within the threshold 1304A through 1304C, the end-effector 1306A through 1306C then being translated while remaining within the threshold 1304A through 1304C of the virtual object 1302A through 1302C, in the arrangement of FIG. 13C the stimulus can be considered to have been delivered. The defined response to that stimulus is then executed.

For the arrangement shown in FIG. 13A through FIG. 13C, one possible response would be for the system controlling the three dimensional interface to register a "swipe" input. That is, since the end-effector 1306A through 1306C has been brought within the threshold 1304A through 1304C of the virtual object 1302A through 1302C, and the end-effector 1306A through 1306C has been translated while within the threshold 1304A through 1304C of the virtual object 1302A through 1302C, the controlling system would register that the virtual object 1302A through 1302C has now been swiped.

As described previously, the controlling system may then take one or more actions further to registering the stimulus. That is, the swipe input may "do something" within the system, which may in turn have an effect within the three dimensional interface. However, possible actions that may follow from a touch input may vary considerably. For example, swiping a virtual object—that is, applying a suitable stimulus such that the response is a swipe input—could be cause for the controlling system to move, rotate, refresh, reshape, etc., or otherwise alter the virtual object (or some feature or function associated with the virtual object).

Moreover, different directions of translation by the end-effector 1306A through 1306C may correspond with different changes. For example, an upward translation, a downward translation, a leftward translation, and a rightward translation might because for the controlling system to execute an up-swipe, a down-swipe, a left-swipe, or a right-swipe, respectively. Similarly, in-swipes and out-swipes might be executed responsive to translation by the end-effector 1306A through 1306C inward (e.g. toward a user) or outward (e.g. away from a user) clockwise-swipes and counterclockwise-swipes might be executed responsive to translation by the end-effector 1306A through 1306C in clockwise and counterclockwise motions. However, such actions are examples only, and other arrangements may be equally suitable.

Figure 14:
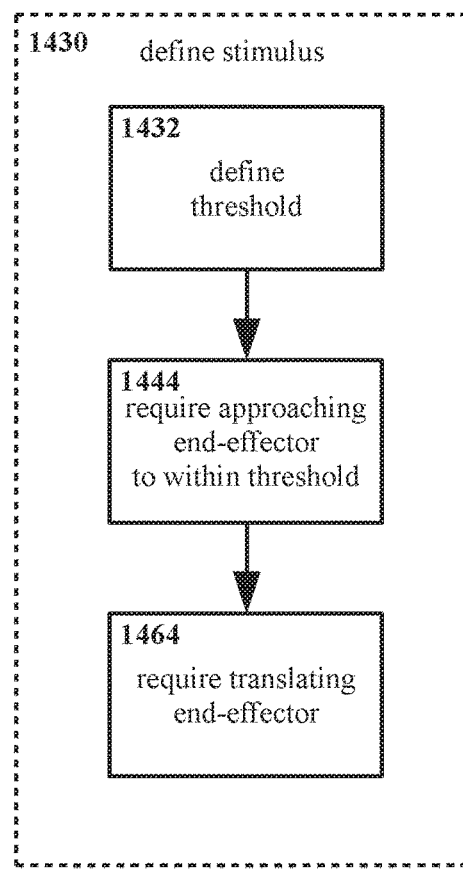
FIG. 14 shows an embodiment of a method for imparting a swipe input to a three dimensional interface in accordance with the present disclosure.

Referring now to FIG. 14, a method for defining a stimulus 1430 is shown therein. As noted previously with regard to FIG. 2, defining a stimulus may itself be a step in a method (as shown in FIG. 2) for interacting with a three dimensional interface in accordance with the present disclosure. In FIG. 14, an example of a step of defining a stimulus 1430 in accordance with the present disclosure is further illustrated in terms of sub-steps; the sub-steps for defining a stimulus 1430 in FIG. 14 correspond approximately with the interactions illustrated in FIG. 13A through FIG. 13C.

As shown in FIG. 14, in defining a stimulus 1430 to a virtual object, a threshold for that virtual object may also be defined 1432. As has been described earlier, the threshold may be defined in a variety of ways. In addition, as has also been described earlier, defining the threshold 1432 as part of defining the stimulus 1430 is an example only; it may be equally suitable, for example, to define the threshold as part of generating the virtual object, instead, and other arrangements may also be equally suitable.

In addition, defining the stimulus 1430 may include requiring an end-effector to approach within the threshold 1444 of the virtual object. That is, the stimulus itself would be defined 1430 (at least partially) as an end-effector approaching a virtual object to within the threshold 1444.

Likewise, defining the stimulus 1430 may include requiring the end-effector to move while within the threshold. Specifically, the stimulus as shown in FIG. 14 includes requiring the end-effector to be translated 1464 in some direction or directions while the end-effector is within the threshold.

It is noted that the arrangement shown in FIG. 14—approach of an end-effector to within a threshold of a virtual object 1444, and translation of the end-effector 1464 within the threshold of the virtual object-corresponds approximately with a "swipe" input as described with regard to FIG. 13A through FIG. 13C.

It is emphasized that the method for defining a stimulus 1430 as shown in FIG. 14 is an example only, and that other arrangements may be equally suitable.

As shown thus far, gestures for interacting with a three dimensional interface in accordance with the present disclosure have been "single point" gestures. i.e. gestures utilizing a simple, minimal structure such as a single finger. For certain embodiments, such an arrangement may be advantageous, for example to simplify issues related to manipulating the end-effector(s), to simplify imaging and/or processing for recognition and tracking, etc. In addition, as has already been noted, the use of fingers generally is an example only, and other end-effectors, including but not limited to a stylus, may be equally suitable.

Moreover, the use of single and/or individual end-effectors is also an example only, and other arrangements may be equally suitable. Examples of arrangements for utilizing pairs of end-effectors, specifically pairs of adjacent fingers, are described below. However, the present disclosure is not limited to only pairs of end-effectors, or to pairs of adjacent fingers, and other arrangements may be equally suitable.

FIG. 15A through FIG. 15D, show an example of end-effector configurations as may be implemented in applying an alternative peg stimulus to a virtual object in accordance with the present disclosure.

As has been noted previously a hand or finger may be utilized as an end-effector for applying a stimulus to a virtual object, thus manipulating a three dimensional interface. With regard to FIG. 15A through FIG. 15D, it is noted that multiple end-effectors, including but not limited to multiple fingers on a hand, may also be used in cooperation to apply a stimulus to a virtual object.

Figure 15A:
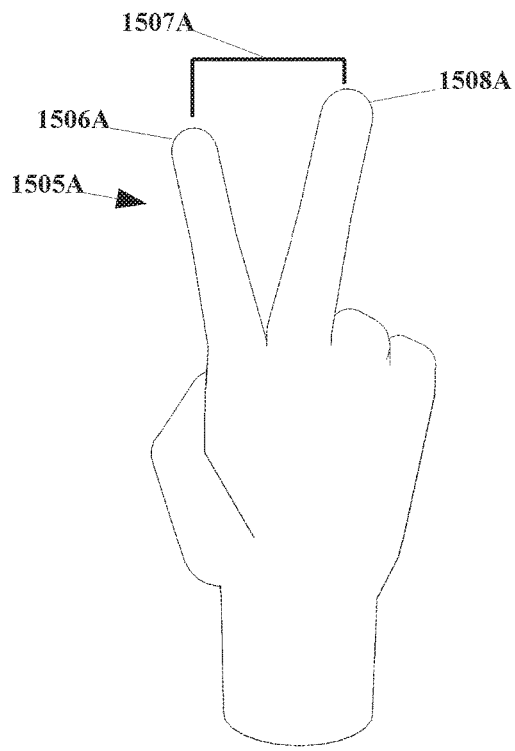
FIG. 15A through FIG. 15D show multiple end-effectors in configurations suitable for imparting inputs to a virtual object in accordance with the present disclosure.

In FIG. 15A, a user's hand 1505A is shown, with first and second fingers thereof 1506A and 1508A extended. The tips of the first and second fingers 1506A and 1508A are spread by a distance 1507A. With two fingers 1506A and 1508A available as end-effectors, additional parameters can be considered with regard to applying stimuli. For example, given that in a three dimensional interface two spread fingers 1506A and 1508A are necessarily in slightly different positions, those first and second fingers 1506A and 1508A, respectively, will not necessarily make contact with a virtual object, or come within a threshold of a virtual object, simultaneously. Thus, consideration can be given to whether one finger 1506A or 1508A is in contact with a virtual object/within a threshold thereof, both fingers 1506A and 1508A are in contact with the virtual object/within a threshold thereof, the order in which the fingers 1506A and 1508A make contact with the virtual object/within a threshold thereof, etc.

Figure 15B:
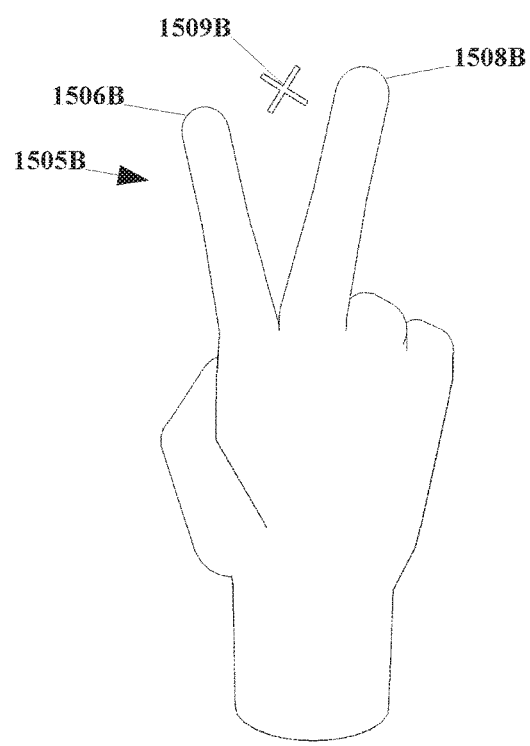

Turning to FIG. 15B, one example of an approach for addressing positional matters related to the use of multiple end-effectors is shown therein. In FIG. 15B, a composite point 1509B is identified between the first and second fingers 1506B and 1508B of the hand 1505B. The composite point 1509B is a single point defined with respect to the first and second fingers 1506B and 1508B. By defining a single composite point 1509B for a pair of end-effectors (e.g. fingers 1506B and 1508B), a distinct single position for both end-effectors 1506B and 1508B may be specified and utilized, rather than considering two separate positions (one for each end-effector 1506B and 1508B).

As shown in FIG. 15B the composite point 1509B is disposed midway between the first and second fingers 1506B and 1508B, however this is an example only. Other arrangements may be equally suitable, for example defining the composite point at the top of the first or second fingers 1506B and 1508B; in such instance the position of a pair of fingers 1506B and 1508B may be considered to be the position of one of those fingers 1506B and 1508B. Other arrangements may be equally suitable.

Figure 15C:
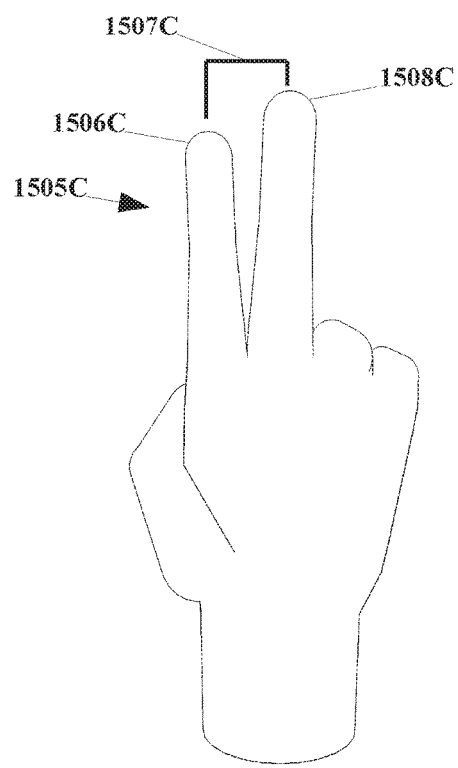
Figure 15D:
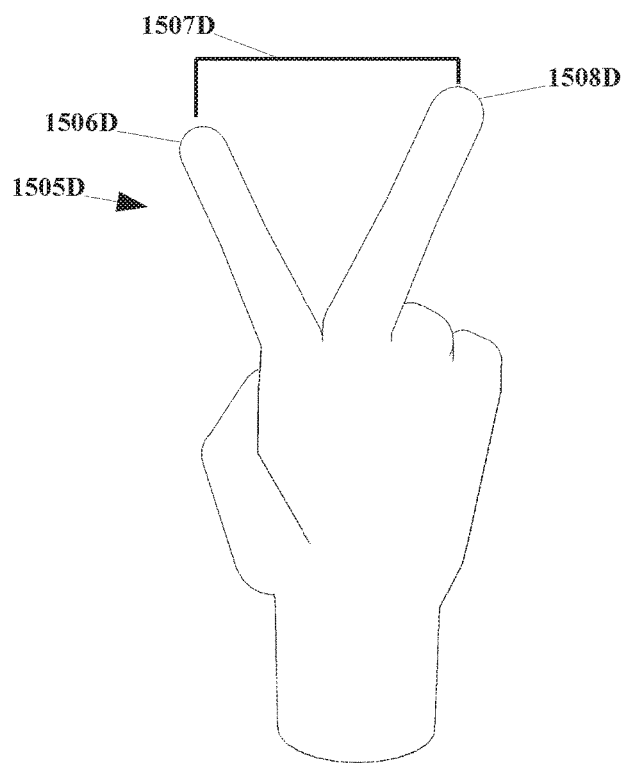

With regard to FIG. 15C and FIG. 15D, another parameter that may be considered with regard to a first end-effector 1506C and 1506D and a second end-effector 1508C and 1508D is shown. As may be seen by comparison of FIG. 15C and FIG. 15D, the distance 1507C between the tips of the first and second fingers 1506C and 1508C in FIG. 15C is less than the distance 1507D between the tips of the first and second fingers 1506D and 1508D in FIG. 15D.

The separation distance 1507C and 1507D may be considered in defining stimuli. For example, the separation distance 1507C and 1507D might be limited to a particular range, with the separation distance 1507C in FIG. 15C being a minimum, and the separation distance 1507D in FIG. 15D being a maximum. In such instance, stimuli might only be considered to be applied if the separation distance is somewhere in the range between the minimum 1507C and the maximum 1507D.

Moreover, if while applying a stimulus a stimulus the user spreads the tips of his or her first finger 1506C and 1506D and his or her second finger 1508C and 1508D so that the separation distance 1507D exceeds that shown in FIG. 15D, the stimulus may be considered to be discontinued. Likewise, if the user brings together the tips of his or her first finger 1506C and 1506D and his or her second finger 1508C and 1508D so that the separation distance 1507C is less than that shown in FIG. 15C, the stimulus also may be considered to be discontinued.

However, such an arrangement is an example only. Other arrangements for considering spacing between two end-effectors with regard to applying stimuli, including not considering spacing at all, may be equally suitable.

It is noted that for arrangements wherein the separation distance 1507A through 1507D is considered with regard to applying a stimulus, and wherein the stimulus constitutes and/or causes a peg input to the controlling system, the separation distance 1507A through 1507D between the end-effector 1506A through 1506D and the second end-effector 1508A through 1508D may be referred to for convenience as a "peg distance".

Figure 16A:
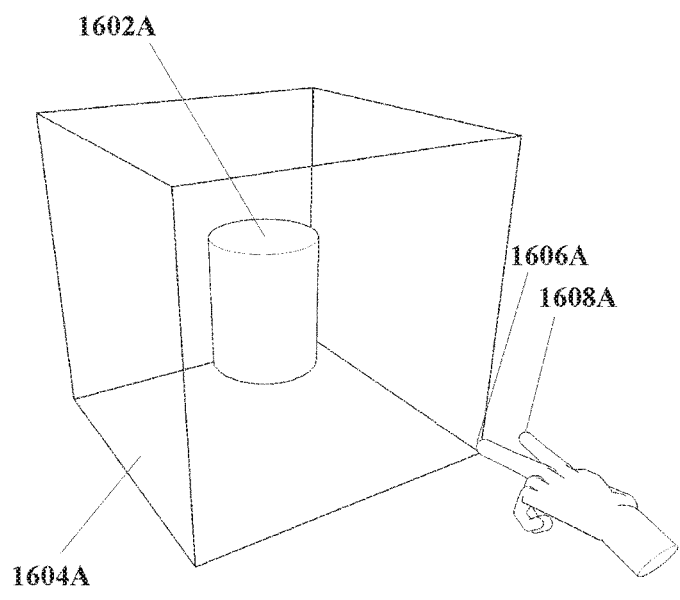
FIG. 16A and FIG. 16B show end-effectors imparting a peg input to a virtual object in accordance with the present disclosure.
Figure 16B:
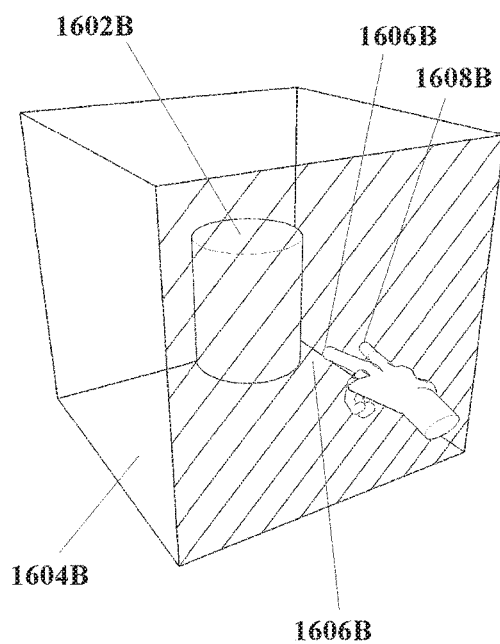

Referring now to FIG. 16A and FIG. 16B, an example is shown therein of end-effectors imparting a peg stimulus to a virtual object in accordance with the present disclosure.

In FIG. 16A, a virtual object 1602A is shown, with a threshold defined 1604A in the form of a cube substantially centered on the virtual object 1602A. First and second end-effectors 1606A and 1608A, respectively, are illustrated in the form of spread first and second fingers of a user's hand, but the end-effectors 1606A and 1608A are some distance from the virtual object 1602A, and in particular the end-effector 1606A and 1608A is not within the threshold 1604A.

In FIG. 16B, the end-effectors 1606B and 1608B have approached the virtual object 1602B to within the threshold 1604B. As illustrated, the end-effectors 1606B and 1608B have reached the threshold 1604B. The face of the threshold 1604B that the end-effector 1606B and 1608B have reached is highlighted with diagonal hatching to indicate for purposes of clarity that the end-effectors 1606B and 1608B have approached the virtual object 1602B to within the threshold 1604B. However, as noted elsewhere, in practice the threshold 1604B may not be visible (though a visible threshold 1604B is not excluded).

Given an arrangement, for example, wherein the stimulus for the virtual object 1602B is defined as two spread end-effectors 1606B and 1608B approaching the virtual object 1602B to within the threshold 1604B, in the arrangement of FIG. 16B the stimulus can be considered to have been delivered. The defined response to that stimulus is then executed.

However, for some embodiments the stimulus may include other criteria beyond those visually depicted in FIG. 16A and FIG. 16B, for example the matter of separation distance between first and second end-effectors 1606B and 1608B, respectively. As previously described with regard to FIG. 15A through FIG. 15D, separation distance may for example be a factor in determining whether a stimulus is considered to have been applied or not, i.e. a stimulus may not be considered to have been applied if the separation distance is outside of a prescribed range.

In addition, as noted with regard particularly to FIG. 15B, for some embodiments consideration may be given to factors arising from the use of two end-effectors at once. That is, are the end effectors considered collectively to approach within a threshold of a virtual object if one of those end-effectors approaches within the threshold of the virtual object? If both end-effectors approach within the threshold of the virtual object? If a composite point associated with both end-effectors approaches within the threshold of the virtual object? The present disclosure is not particularly limited to which of those options, or other possible options, may be selected, but such factors may have bearing in whether and how specific embodiments determine whether or not a stimulus has been applied.

Referring again to FIG. 16A and FIG. 16B, for the arrangement shown therein one possible response would be for the system controlling the three dimensional interface to register a "peg" input. That is, since the first end-effector 1606A and 1606B and the second end-effector 1608A and 1608B have been brought within the threshold 1604A and 1604B of the virtual object 1602A and 1602B, the controlling system would register that the virtual object 1602A and 1602B has now been pegged.

As described previously, the controlling system may then take one or more actions further to registering the stimulus. That is, the peg input may "do something" within the system, which may in turn have an effect within the three dimensional interface. However, possible actions that may follow from a touch input may vary considerably. For example, pegging a virtual object—that is, applying a suitable stimulus such that the response is a peg input-could be cause for the controlling system to engage and/or attach the virtual object to the end-effectors applying the peg stimulus, to engage and/or attach some part of and/or location on the virtual object to the end-effectors applying the peg stimulus or to the composite point or some other point or feature defined with respect to the end-effectors, etc. However, such actions are examples only.

Figure 17:
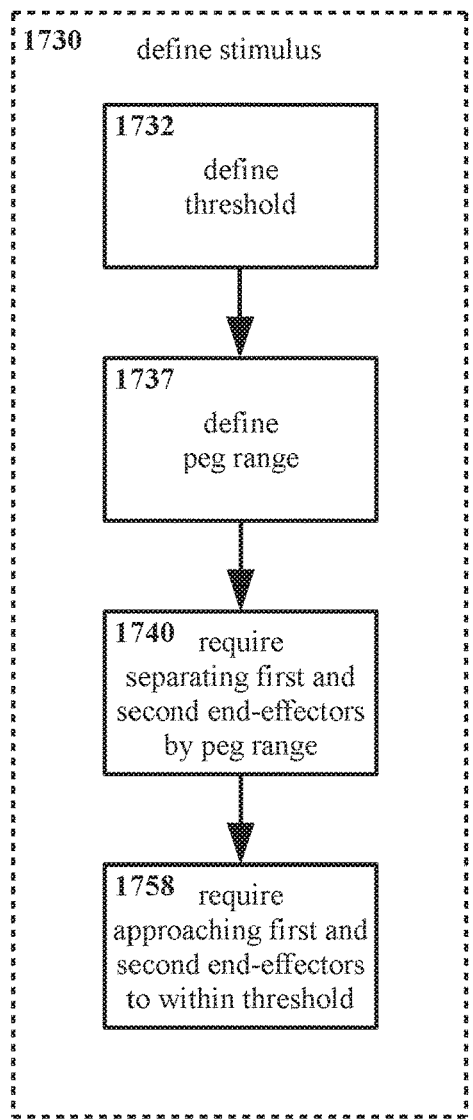
FIG. 17 shows an alternate embodiment of a method for imparting a peg input to a three dimensional interface in accordance with the present disclosure.

Referring now to FIG. 17, a method for defining a stimulus 1730 is shown therein. As noted previously with regard to FIG. 2, defining a stimulus may itself be a step in a method (as shown in FIG. 2) for interacting with a three dimensional interface in accordance with the present disclosure. In FIG. 17, an example of a step of defining a stimulus 1730 in accordance with the present disclosure is further illustrated in terms of sub-steps; the sub-steps for defining a stimulus 1730 in FIG. 17 correspond approximately with the interactions illustrated in FIG. 16A and FIG. 16B.

As shown in FIG. 17, in defining a stimulus 1730 to a virtual object, a threshold for that virtual object may also be defined 1732. As has been described earlier, the threshold may be defined in a variety of ways. In addition, as has also been described earlier, defining the threshold 1732 as part of defining the stimulus 1730 is an example only; it may be equally suitable, for example, to define the threshold as part of generating the virtual object, instead, and other arrangements may also be equally suitable.

Defining the stimulus 1730 may include defining other parameters. For some stimuli, for example for stimuli applied with multiple end-effectors, it may be required or at least useful for stimuli to be defined 1730 at least in part in terms of the relative position and/or separation of those end-effectors. For example, it might be required that first and second end-effectors be separated by a distance, or by a range of distances, in order for the end-effectors to be considered to apply a stimulus. For the arrangement shown in FIG. 17, a peg range is defined 1737, identifying a range of distances, angles, etc. separating first and second end-effectors. If the first and second end-effectors are separated by an amount within the peg range, the first and second end-effectors may be considered with regard to applying a stimulus. Conversely, if the first and second end-effectors are separated by more than the peg range, or by less than the peg range, the first and second end-effectors may not be considered with regard to applying a stimulus.

For the example of FIG. 17, defining the stimulus 1730 includes requiring separation of first and second end-effectors by the peg range 1740.

In addition, defining the stimulus 1730 may include motions of and/or other actions with one or more end-effectors, e.g. relative to a virtual object and/or a threshold thereof.

For the example of FIG. 11, defining the stimulus 1730 includes requiring both the first and second end-effectors to approach within the threshold of the virtual object 1758 while the first and second end-effectors remain separated by the peg range as specified in step 1740.

It is noted that the arrangement shown in FIG. 17—separation of first and second end-effectors by a peg range 1740, and approach of the first and second end-effectors to within a threshold of a virtual object 1758—corresponds approximately with a "peg" input as described with regard to FIG. 16A and FIG. 16B.

Figure 18:
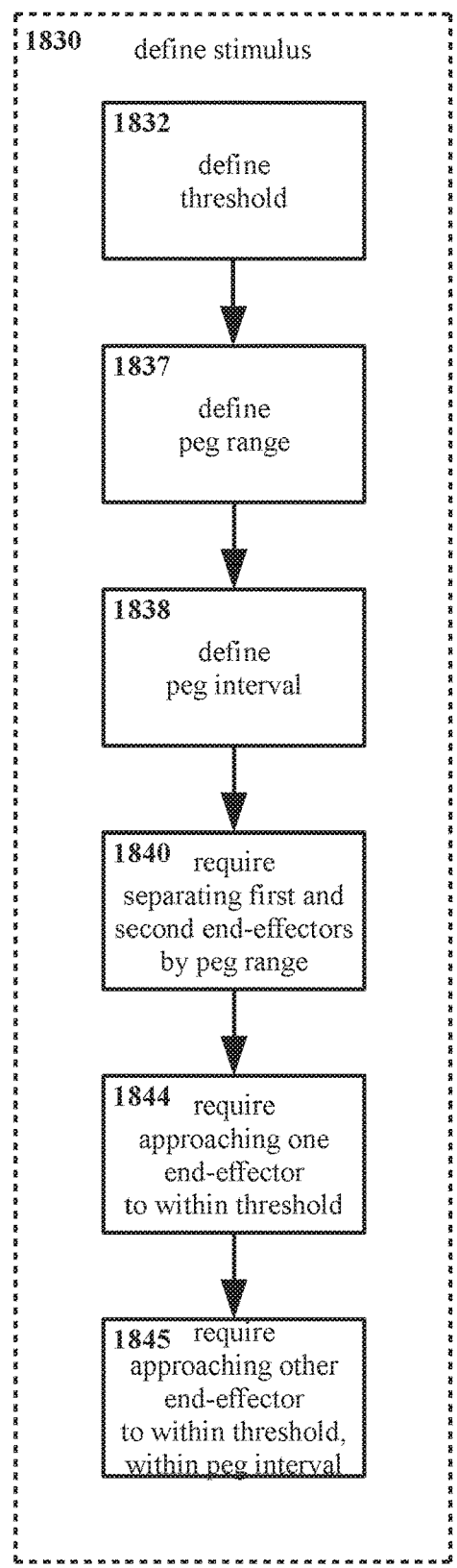
FIG. 18 shows another alternate embodiment of a method for imparting a peg input to a three dimensional interface in accordance with the present disclosure.

Turning to FIG. 18, another method for defining a stimulus 1830 is shown therein, distinct from but with similarities to the method shown in FIG. 17. In FIG. 18, another example of a step of defining a stimulus 1830 in accordance with the present disclosure is further illustrated in terms of sub-steps; the sub-steps for defining a stimulus 1830 in FIG. 18 again correspond approximately with the interactions illustrated in FIG. 16A and FIG. 16B.

As shown in FIG. 18, in defining a stimulus 1830 to a virtual object, a threshold for that virtual object may also be defined 1832.

Defining the stimulus 1830 may include defining other parameters. For the arrangement shown in FIG. 18, a peg range is defined 1837, identifying a range of distances, angles. etc. separating first and second end-effectors.

Defining the stimulus 1830 may include defining intervals of time. For some stimuli, for example for stimuli considering two or more end-effectors, it may be required or at least useful for stimuli to be defined 1830 at least in part in terms of the timing of an action or actions. For example, it might be required that after one step takes place, a later step must take place within a certain period of time. For the arrangement shown in FIG. 18, a peg interval of time is defined 1838.

For the example of FIG. 18, defining the stimulus 1830 includes requiring separation of first and second end-effectors by the peg range 1840.

In addition, defining the stimulus 1830 includes the requiring one of the first and second end-effectors to approach within the threshold of the virtual object 1844, while the first and second end-effectors remain separated by the peg range as specified in step 1840. Defining the stimulus also includes requiring the other of the first and second end-effectors to approach within the threshold of the virtual object 1845, within the peg interval as defined in step 1838.

It is noted that the arrangement shown in FIG. 18—separation of first and second end-effectors by a peg range 1840, approach of one end-effector to within a threshold of a virtual object 1844, and approach of the other end-effector to within a threshold of a virtual object 1845 within a peg interval-corresponds approximately with a "peg" input as described with regard to FIG. 16A and FIG. 16B.

It is also pointed out that, as noted, the methods of FIG. 17 and FIG. 18 are at least somewhat related. Notably, however, where the method of FIG. 17 requires only that the first and second end-effectors both approach a virtual object to within a threshold, the method of FIG. 18 requires that the first and second end-effectors reach the threshold within a time period defined by the peg interval. Depending on the particular embodiment, either approach may be equally suitable, but both methods for defining a stimulus 1730 and 1830 as shown in FIG. 17 and FIG. 18 are examples only. Other variations for determining whether multiple cooperating end-effectors may be considered to be at a position, within a threshold, etc. are also possible, and may be equally suitable. (This matter is also discussed with regard to FIG. 16A through FIG. 16D, and is further addressed with regard to FIG. 19A through FIG. 19C.)

It will be observed that, among other differences, the two-finger "peg" input as described with regard to FIG. 16 through FIG. 18 differs from the one-finger "peg" input described with regard to FIG. 9 and FIG. 10 in that as described, the description of the one-finger peg incorporates a third interval (see step 1059) such that the end-effector is required to remain within the threshold of the virtual object for at least the duration of the third interval, while the two-finger peg is not described as including such a third interval.

Use of a third interval is an example only. Likewise, as already noted, use of multiple finger (and/or multiple other end-effector) gestures is also an example only. The use of time intervals and multiple end-effectors are presented herein as examples of arrangements by which one input (e.g. posture/gesture) may be distinguished from another input. For example, a peg input may be distinguished from a touch input through the use of a third interval as described with respect to FIG. 9 and FIG. 10, or a peg input may be distinguished from a touch input through the use of multiple fingers as described with respect to FIG. 16 through FIG. 18. Other arrangements for distinguishing inputs may be equally suitable, and the present disclosure is not particularly limited with regard to specific arrangements used to distinguish inputs. In addition, multiple approaches for distinguishing inputs may be used; for example, although the arrangement described for a peg input with regard to FIG. 16 through FIG. 18 does not explicitly include a third interval, use of a third interval (i.e. similar to the use of a third interval for the one-finger peg input of FIG. 9 and FIG. 10) is not excluded, and may be advantageous for certain embodiments.

Figure 19A:
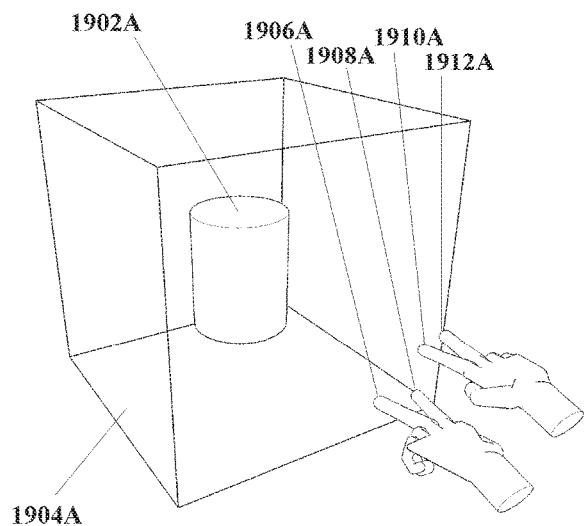
FIG. 19A through FIG. 19C show end-effectors imparting a scale input to a virtual object in accordance with the present disclosure.
Figure 19B:
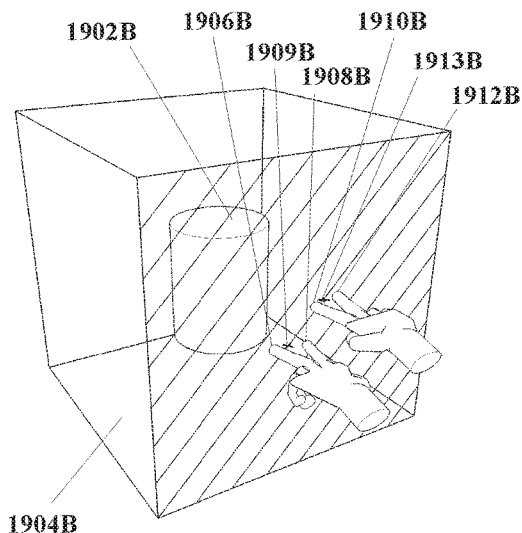
Figure 19C:
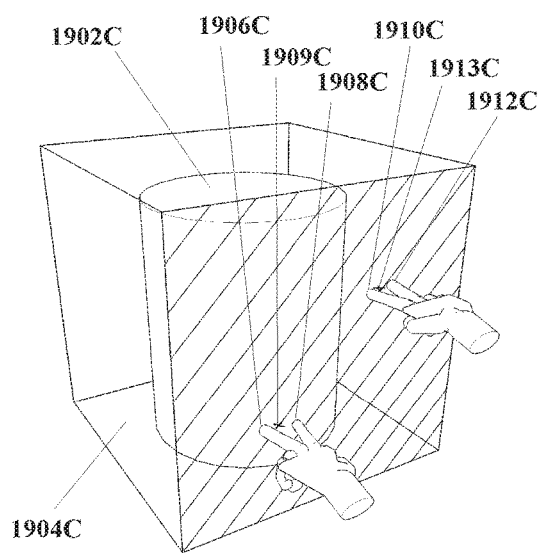

FIG. 19A through FIG. 19C, show an alternate example of end-effectors imparting a scale stimulus to a virtual object in accordance with the present disclosure.

In FIG. 19A, a virtual object 1902A is shown, with a threshold defined 1904A in the form of a cube substantially centered on the virtual object 1902A. First and second end-effectors 1906A and 1908A are illustrated in the form of spread fingers of a user's hand. Third and fourth end-effectors 1910A and 1912A are also illustrated in the form of spread fingers of another hand. The end-effectors 1906A, 1908A, 1910A, and 1912A are some distance from the virtual object 1902A, and in particular the end-effectors 1906A, 1908A. 1910A, and 1912A are not within the threshold 1904A.

In FIG. 19B, a first composite point 1909B has been defined to represent a single position for the collective first and second end-effectors 1906B and 1908B. Similarly, a second composite point 1913B has been defined to represent a single position for the collective first and second end-effectors 1910B and 1912B. The composite points 1909B and 1913B are shown in FIG. 19B as x-marks, however in practice the composite points 1909B and 1913B may not be visible (though visible composite points 1909B and 1913B are not excluded).

In addition, the composite points 1909B and 1913B-representing first and second end effectors 1906B and 1908B and third and fourth end effectors 1910B and 1912B, respectively—have approached the virtual object 1902B to within the threshold 1904B. The face of the threshold 1904B that the composite points 1909B and 1913B have reached is highlighted with diagonal hatching to indicate for purposes of clarity that the composite points 1909B and 1913B have approached the virtual object 1902B to within the threshold 1904B. However, as noted elsewhere, in practice the threshold 1904B may not be visible (though a visible threshold 1904B is not excluded).

In FIG. 19C, the first and second composite points 1909C and 1913C-representing first and second end effectors 1906C and 1908C and third and fourth end effectors 1910C and 1912C, respectively-remain within the threshold 1904C of the virtual object 1902C. However, visible inspection reveals that the distance between the first and second composite points 1909C and 1913C has altered from FIG. 19B to FIG. 19C.

Given an arrangement, for example, wherein the stimulus for the virtual object 1902C is defined as first and second spread end-effectors 1906B and 1908B and third and fourth spread end-effectors 1910B and 1912B approaching the virtual object 1902C to within the threshold 1904C, and the distance between the first and second spread end-effectors 1906B and 1908B and the third and fourth spread end-effectors 1910B and 1912B being altered, in the arrangement of FIG. 19C the stimulus can be considered to have been delivered. The defined response to that stimulus is then executed.

For some embodiments the stimulus may include other criteria beyond those visually depicted in FIG. 19A through FIG. 19C, for example the matter of separation distance between first and second end-effectors 1906A through 1906C and 1908A through 1908C and separation distance between third and fourth end effectors 1910A through 1910C and 1912A through 1912C. As previously described with regard to FIG. 15A through FIG. 15D, separation distance may for example be a factor in determining whether a stimulus is considered to have been applied or not, i.e. a stimulus may not be considered to have been applied if the separation distance is outside of a prescribed range.

In addition, as noted with regard particularly to FIG. 15B, for some embodiments consideration may be given to factors arising from the use of two end-effectors at once. That is, are the end effectors considered collectively to approach within a threshold of a virtual object if one of those end-effectors approaches within the threshold of the virtual object? If both end-effectors approach within the threshold of the virtual object? If a composite point associated with both end-effectors approaches within the threshold of the virtual object? The present disclosure is not particularly limited to which of those options, or other possible options, may be selected, but such factors may have bearing in whether and how specific embodiments determine whether or not a stimulus has been applied.

As already described, for purposes of the example shown in FIG. 19A through FIG. 19C, first and second composite points are defined and used for determining whether and when associated end-effectors collectively are considered to approach within the threshold of a virtual object. However, such an arrangement is an example only, and other arrangements may be equally suitable.

Referring again to FIG. 19A through FIG. 19C, for the arrangement shown therein one possible response would be for the system controlling the three dimensional interface to register a "scale" input. That is, since the first end-effector 1906A through 1906C and the second end-effector 1908A through 1908C (represented by the first composite point 1909A through 1909C) have been brought within the threshold 1904A through 1904C of the virtual object 1902A through 1902C, and the third end-effector 1910A through 1910C and the second end-effector 1912A through 1912C (represented by the first composite point 1913A through 1913C) have been brought within the threshold 1904A through 1904C of the virtual object 1902A through 1902C, and the distance between the first end-effector 1906A through 1906C and the second end-effector 1308A through 1308C (represented by the first composite point 1909A through 1909C) and the third end-effector 1910A through 1910C and the second end-effector 1912A through 1912C (represented by the first composite point 1913A through 1913C) has been altered, the controlling system would register that the virtual object 1902A through 1902C has now been scaled.

As described previously, the controlling system may then take one or more actions further to registering the stimulus. That is, the scale input may "do something" within the system, which may in turn have an effect within the three dimensional interface. However, possible actions that may follow from a touch input may vary considerably. For example, scaling a virtual object—that is, applying a suitable stimulus such that the response is a scale input-could be cause for the controlling system to increase or decrease one or more dimensions of the virtual object, etc. Such an example is illustrated in FIG. 19B and FIG. 19C; by visual examination it may be seen that the virtual object 1902C in FIG. 19C is larger than the virtual object 1902B in FIG. 19B. Thus, as illustrated, increasing the distance between the first and second composite points 1909B and 1913B as shown in FIG. 19B to the distance between the first and second composite points 1909C and 1913C as shown in FIG. 19C results in the controlling processor executing an increase in scale, wherein the magnitude of at least one dimension (as shown, all three dimensions) of the virtual object increases. Decreasing the distance might similarly produce a decrease in scale, wherein the magnitude of at least one dimension of the virtual object decreases. However, such actions are examples only.

Figure 20:
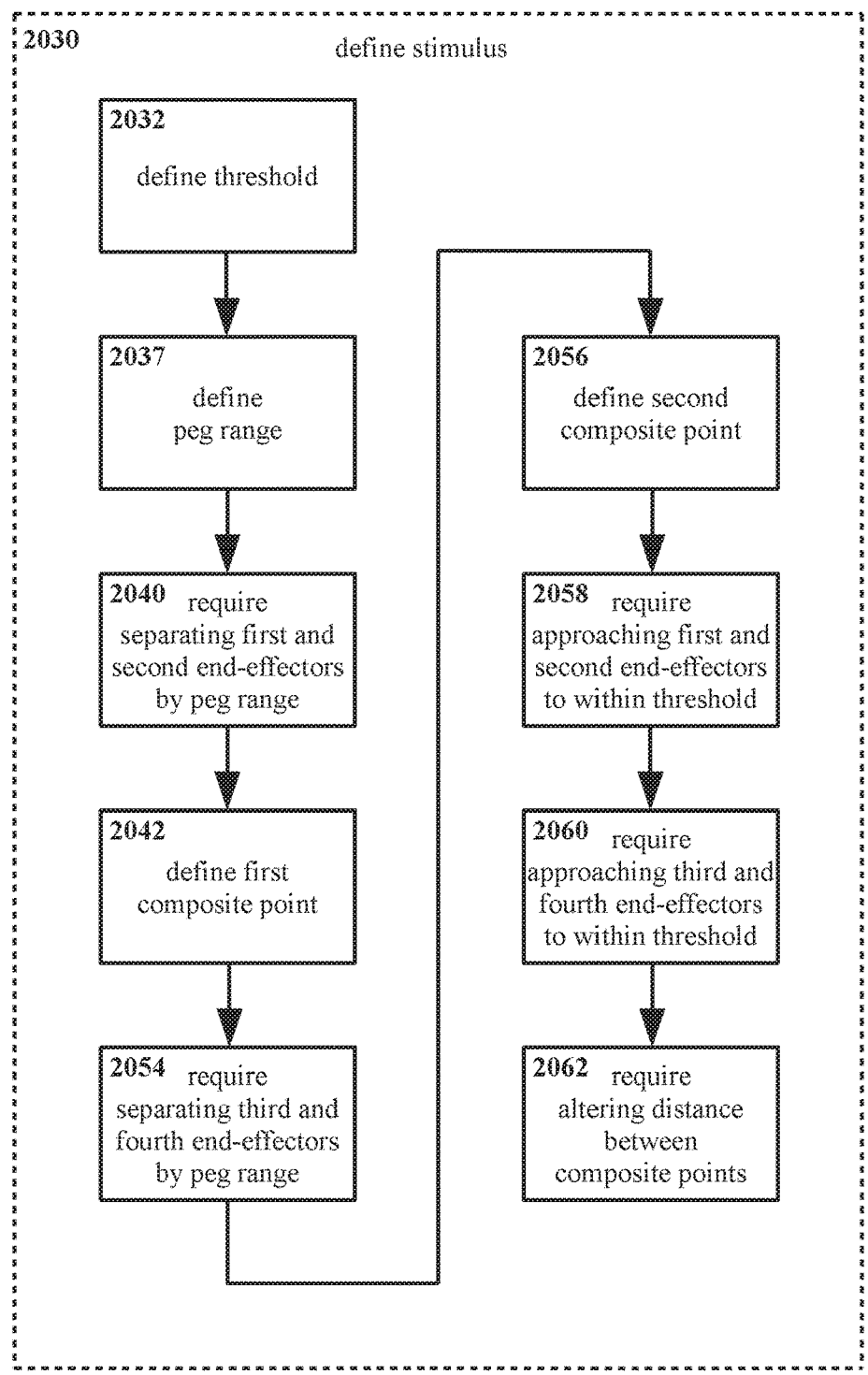
FIG. 20 shows an alternate embodiment of a method for imparting a scale input to a three dimensional interface in accordance with the present disclosure.

Referring now to FIG. 20, a method for defining a stimulus 2030 is shown therein. As noted previously with regard to FIG. 2, defining a stimulus may itself be a step in a method (as shown in FIG. 2) for interacting with a three dimensional interface in accordance with the present disclosure. In FIG. 20, an example of a step of defining a stimulus 2030 in accordance with the present disclosure is further illustrated in terms of sub-steps; the sub-steps for defining a stimulus 2030 in FIG. 20 correspond approximately with the interactions illustrated in FIG. 19A through FIG. 19C.

As shown in FIG. 20, in defining a stimulus 2030 to a virtual object, a threshold for that virtual object may also be defined 2032. As has been described earlier, the threshold may be defined in a variety of ways. In addition, as has also been described earlier, defining the threshold 2032 as part of defining the stimulus 2030 is an example only; it may be equally suitable, for example, to define the threshold as part of generating the virtual object, instead, and other arrangements may also be equally suitable.

Defining the stimulus 2030 may include defining other parameters. For some stimuli, for example for stimuli applied with multiple end-effectors, it may be required or at least useful for stimuli to be defined 2030 at least in part in terms of the relative position and/or separation of those end-effectors. For example, it might be required that end-effectors be separated by a distance, or by a range of distances, in order for the end-effectors to be considered to apply a stimulus. For the arrangement shown in FIG. 20, a peg range is defined 2037, identifying a range of distances, angles, etc. separating first and second end-effectors and separating the third and fourth end-effectors. If the first and second end-effectors are separated by an amount within the peg range, the first and second end-effectors may be considered with regard to applying a stimulus; likewise with the third and fourth end-effectors. Conversely, if the first and second end-effectors are separated by more than the peg range, or by less than the peg range, the first and second end-effectors may not be considered with regard to applying a stimulus; likewise with the third and fourth end-effectors.

In addition, as described with regard particularly to FIG. 15B, for some embodiments it may be necessary or at least useful to identify a composite point between two end-effectors, so that two (or more) end-effectors at different positions may be treated for at least some purposes as if those end-effectors have a single point location.

For the example of FIG. 20, defining the stimulus 2030 includes requiring separation of first and second end-effectors by the peg range 2040.

Defining the stimulus 2030 also included defining a first composite point 242 relative to the first and second end effectors. The first composite point may be generated using the geometry of the first and second end-effectors. For example, the first composite point may be defined substantially as a geometric midpoint of the first and second end-effectors. However, such an arrangement is an example only; other arrangements for defining a composite point, including but not limited to defining a composite point for first and second end-effectors as a position of either the first or the second end-effector, may be equally suitable. Likewise, arrangements that do not define a first composite point may also be equally suitable.

Similarly, defining the stimulus 2030 includes requiring separation of third and fourth end-effectors by the peg range 2054, and defining a second composite point 2056 relative to the third and fourth end-effectors.

In addition, defining the stimulus 2030 may include motions of and/or other actions with one or more end-effectors, e.g. relative to a virtual object and/or a threshold thereof.

For the example of FIG. 20, defining the stimulus 2030 includes requiring the first and second end-effectors to approach within the threshold of the virtual object 2058 while the first and second end-effectors remain separated by the peg range as specified in step 20240. Defining the stimulus 2030 also includes requiring the first and second end-effectors to approach within the threshold of the virtual object 2060 while the first and second end-effectors remain separated by the peg range as specified in step 2040.

Further, defining the stimulus 2030 includes requiring an altering of the distance between the first and second composite points 2062.

It is noted that the arrangement shown in FIG. 20—separation of first and second end-effectors by a peg range 2040, separation of third and fourth end-effectors by the peg range 2054, approach of the first and second end-effectors to within a threshold of a virtual object 2058, approach of the third and fourth end-effectors to within the threshold of the virtual object 2060, and altering the spacing between the first and second end-effectors and the third and fourth end-effectors (as represented by the first and second composite points) 2062—corresponds approximately with a "scale" input as described with regard to FIG. 19A through FIG. 19C.

It is emphasized that the method for defining a stimulus 2030 as shown in FIG. 20 is an example only, and that other arrangements may be equally suitable.

Figure 21:
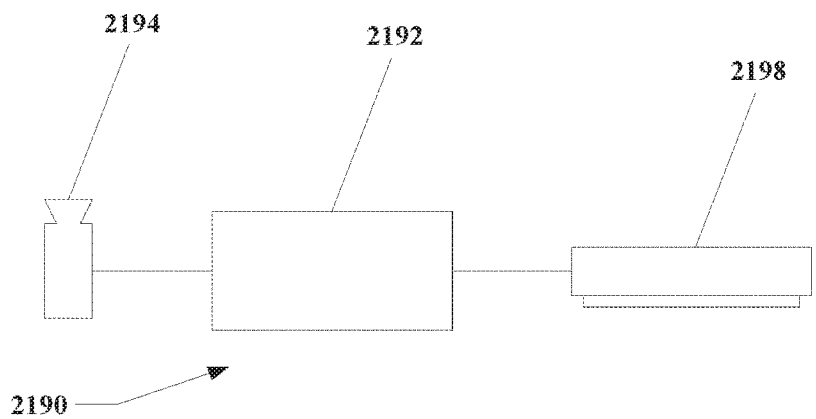
FIG. 21 shows a schematic of an embodiment of an apparatus in accordance with the present disclosure.

FIG. 21 shows an embodiment of an apparatus 2190 for interacting with a three dimensional interface. The apparatus includes a processor 2192, a sensor 2194 in communication with the processor 2192, and a display 2198 in communication with the processor 2192.

The processor 2192 is adapted to generate a three dimensional interface, to generate at least one virtual object in the three dimensional interface. The processor 2192 is also adapted to define a stimulus of the interface, including but not limited to a stimulus to a virtual object in the interface in the form of an approach to the virtual object with an end-effector within a threshold. The processor 2192 is further adapted to define a response to the stimulus, and to execute the response to the stimulus. The display 2198 is adapted to output the three dimensional interface, including the virtual object(s) therein, generated by the processor 2192. The sensor 2194 is adapted to detect the stimulus.

A range of general-purpose, special-purpose, and embedded systems may be suitable for use as the processor 2192. Moreover, it may be equally suitable for the processor 2192 to consist of two or more physical or logical processor components.

A range of devices may be suitable for use as the display 2198, including but not limited to light emitting diodes (LED), organic light emitting diodes (OLED), plasma screen panels (PDP), liquid crystal displays (LCD), etc. Likewise, the use of projected or transmitted displays, where the viewed surface is essentially a passive screen for an image projected or otherwise transmitted after being generated elsewhere, may also be suitable. Other arrangements including but not limited to systems that display images directly onto a user's eyes also may be equally suitable. Either digital or analog display technologies may be suitable.

A range of devices also may be suitable for use as the sensor 2194. As illustrated in FIG. 21, the sensor 2194 is a compact digital camera, adapted to capture images and/or video. A range of cameras, including but not limited to Complementary metal-oxide-semiconductor (CMOS) and charge-coupled device (CCD) cameras, may be suitable. Moreover, sensors other than cameras likewise may be equally suitable, and sensors that capture information other than images and/or video may be equally suitable.

The sensor 2194 is not particularly limited with regard to either what precise event(s) the sensor 2194 may sense in detecting the stimulus, or how the sensor 2194 may sense the stimulus. For certain embodiments, it may be useful for the sensor 2194 to sense the three dimensional position and/or three dimensional motion of the end-effector. For example, a sensor 2194 adapted to sense the three dimensional position/motion of such an end-effector could provide position data that would indicate whether the end-effector has approached the virtual object to within a geometrically defined threshold.

The manner by which the processor 2192 is in communication with the sensor 2194, and the display 2198, and (if present; see below) a response executor is not particularly limited. As illustrated in FIG. 21, components are shown to communicate by wire link, but other arrangements, including but not limited to wireless communication, may be equally suitable.

Likewise, the manner for initiating and/or controlling definition of the stimulus and the response, determination of whether the stimulus is present, and execution of the response is not particularly limited. For certain embodiments, it may be useful for a general operating system instantiated on the processor 2192 to initiate and/or control such functions. This may be advantageous, in that it enables the definition of stimuli, responses, thresholds, etc. for virtual objects without requiring each such virtual object to include capabilities for individually defining stimuli, responses, thresholds, etc.

For example, programs not written to support the use of stimuli and responses, or not written to respond to specific stimuli with specific responses, may still have thresholds defined with respect to those virtual objects; likewise, such virtual objects may still behave and/or be interacted with similarly to virtual objects that were created or modified so as to directly support such behavior and interaction. This may simplify coding, and may help provide backwards compatibility.

However, the use of an operating system in such a way is an example only. It may be equally suitable to initiate and/or control definitions of stimuli, responses, thresholds, etc. through virtual objects themselves, and/or through programs or other constructs associated with the virtual objects, and/or through other approaches.

The response may vary considerably. The response may, for example, include the processor 2192 registering an event and/or input, including but not limited to a user input. Events registered as all or part of a response may include a touch input, a click or single click input, a double click input, a peg input, a scale input, a swipe input, etc. Other events and/or inputs may also be equally suitable.

The stimulus also may vary considerably. As noted, the stimulus may include approaching the virtual object with the end-effector to within the threshold. This stimulus may be associated with a touch input. For example, the stimulus may include approaching the virtual object with the end-effector to within the threshold, and withdrawing the end-effector from the virtual object beyond the threshold within a first time interval. This stimulus may be associated with a click or single click input.

The stimulus may include approaching the virtual object with the end-effector to within the threshold, withdrawing the end-effector from the virtual object beyond the threshold within a first time interval, re-approaching the virtual object with the end-effector within the threshold within a second time interval, and withdrawing the end-effector from the virtual object beyond the threshold within another first time interval. This stimulus may be associated with a double click input.

The stimulus may include approaching the virtual object with first and second end-effectors to within the threshold, with the first and second end-effectors being separated by a peg range. This stimulus may be associated with a peg input. The response may include engaging the virtual object and/or a location thereof with the end-effectors, and/or with a composite point or other point or feature associated with the end-effectors, etc.

The stimulus may include approaching the virtual object with first and second end-effectors to within the threshold with the first and second end-effectors being separated by a peg range, and approaching the virtual object with third and fourth end-effectors to within the threshold with the third and fourth end-effectors being separated by a peg range, and altering a distance between the first and second end-effectors and the third and fourth end-effectors. This stimulus may be associated with a scale input. The response may include a change in magnitude of at least one dimension of the virtual object.

The stimulus may include approaching the virtual object with the end-effector to within the threshold, and translating the end-effector while within the threshold. This stimulus may be associated with a swipe input.

The apparatus may vary considerably from one embodiment to another, in ways including but not limited to the following.

Figure 22:
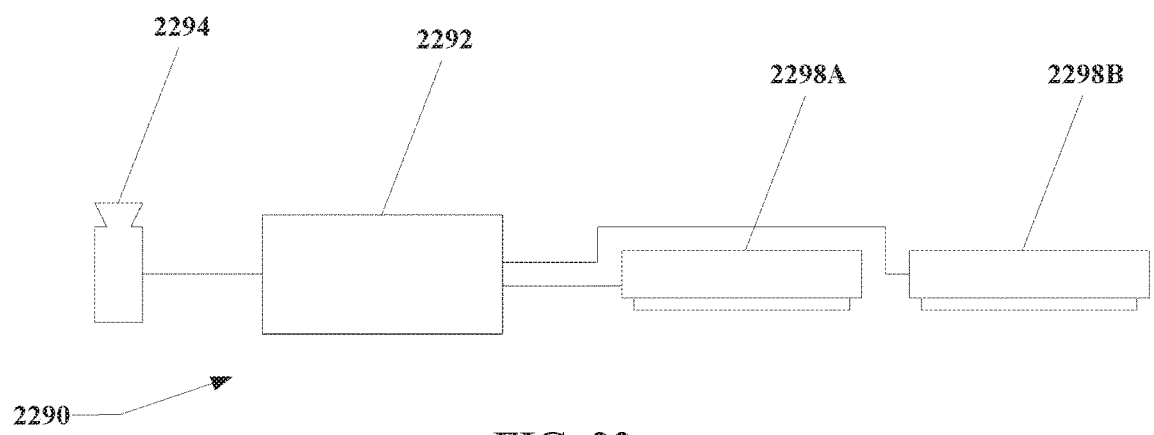
FIG. 22 shows a schematic of another embodiment of an apparatus in accordance with the present disclosure, with stereo sensors.

In FIG. 22, an arrangement of an apparatus 2290 is shown wherein the display is a stereo system, with a first display 2298A and a second display 2298B adapted to generate stereo images. The processor 2292 is adapted to generate a three dimensional interface and a virtual object, with the first and second displays 2298A and 2298B, respectively, outputting the three dimensional interface and virtual object. The sensor 2294 is adapted to detect a stimulus. Such a display arrangement may be useful for some embodiments, as it enables the outputting of three dimensional objects, environments, interfaces, effects, etc., by outputting slightly different images to the first and second displays 2298A and 2298B, respectively, comparable to what would be seen by the user's left and right eyes if they were looking at a physical object in three dimensional space. However, the use of a stereo display system is an example only, and other arrangements may be equally suitable.

Figure 23:
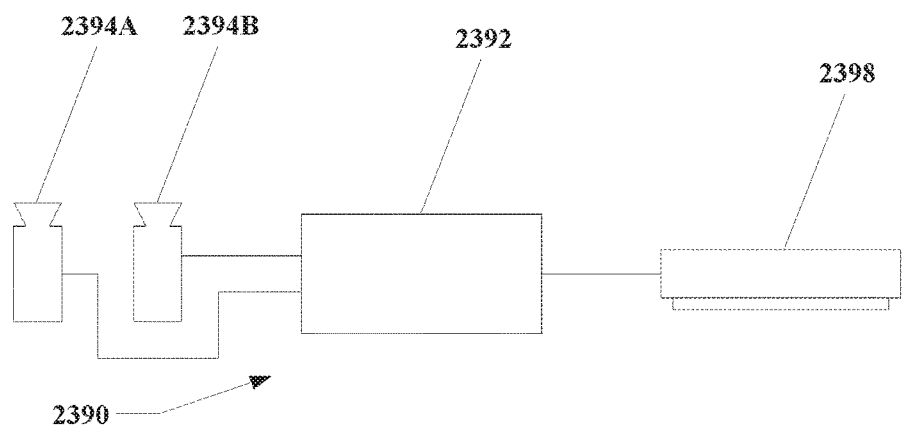
FIG. 23 shows a schematic of another embodiment of an apparatus in accordance with the present disclosure, with stereo displays.

In FIG. 23, an embodiment of an apparatus 2390 is shown with a configuration that would provide position and/or motion data, using two stereo sensors 2394A and 2394B, arranged so as to capture stereo information of an end-effector. The processor 2392 is adapted to generate a three dimensional interface and a virtual object, with the display 2398 outputting the three dimensional interface and virtual object. This arrangement can be useful, in that it enables stereo three dimensional imaging of the environment. For arrangements that use stereo displays (such as the embodiment shown in FIG. 18), it may also be advantageous in that the general approach to capturing three dimensional data would be comparable to the approach for displaying that data. i.e. stereo capture for stereo display. However, arrangements using stereo sensors 2394A and 2394B are an example only, and other arrangements may be equally suitable.

As previously described, a wide range of response to stimuli may be suitable. Responses that exist entirely within the three dimensional interface, such as changes in the size or other appearance features of a virtual object, may be executed by a processor and outputted by a display. For example, the processor may generate the response when the stimulus is communicated to it from the sensor, with the display outputting the result of the response. However, as also noted previously, responses other than visual responses may be equally suitable for some embodiments.

Figure 24:
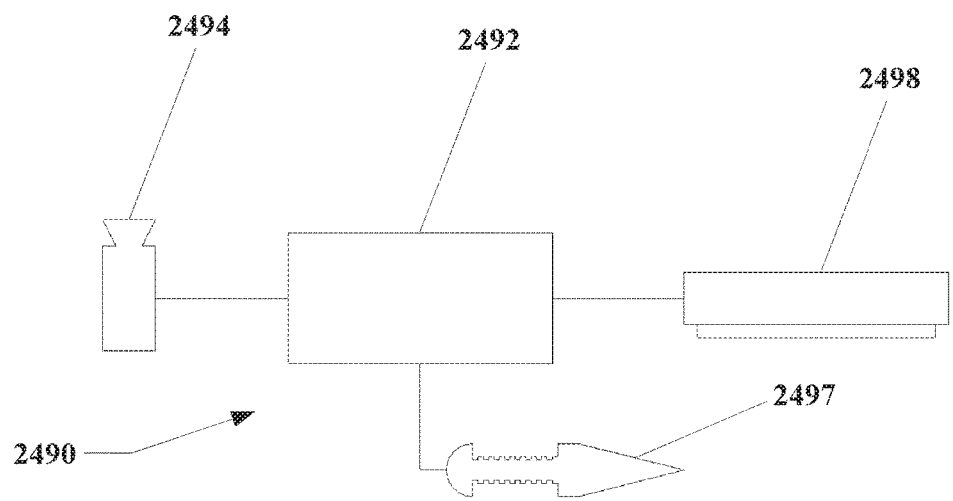
FIG. 24 shows a schematic of another embodiment of an apparatus in accordance with the present disclosure, with an executor.

In FIG. 24, an embodiment of an apparatus 2490 is shown that includes a response executor 2497 in communication with the processor 2492, the response executor 2497 being adapted to execute some or all of the response in cooperation with the processor 2492. The processor 2492 is adapted to generate a three dimensional interface and a virtual object, with the display 2498 outputting the three dimensional interface and virtual object. The sensor 2494 is adapted to detect a stimulus.

As illustrated in FIG. 24, the response executor 2497 takes the form of a stylus. For example, the stylus could be equipped with lights, vibration generators, heating/cooling systems, etc. and could execute responses in cooperation with the processor 2492, so as to serve as a response executor 2497. However, this is an example only, and the response executor 2497 is not limited to the form of or incorporation within a stylus, nor is the response executor 2497 otherwise particularly limited with regard to form.

A response executor 2497 can include systems necessary to execute responses that either cannot be or that for some reason are not executed by the display. A response executor 2497 could, for example, include one or more audio speakers adapted to deliver audio responses. Such speakers might be physically incorporated with the processor 2492, display 2494, and/or sensor 2498, e.g. as headphones, earbuds, etc. for a head mounted display, and/or could be freestanding external speakers. However, this is an example only, and other response executors 2497 may be equally suitable. Other response executors 2497 may include, but are not limited to, light sources, vibration generators, systems to generate heat/cold, etc. Response executors 2497 may be incorporated physically with the processor 2492, display 2494, and/or sensor 2498, and/or may be separate and/or freestanding.

Figure 25:
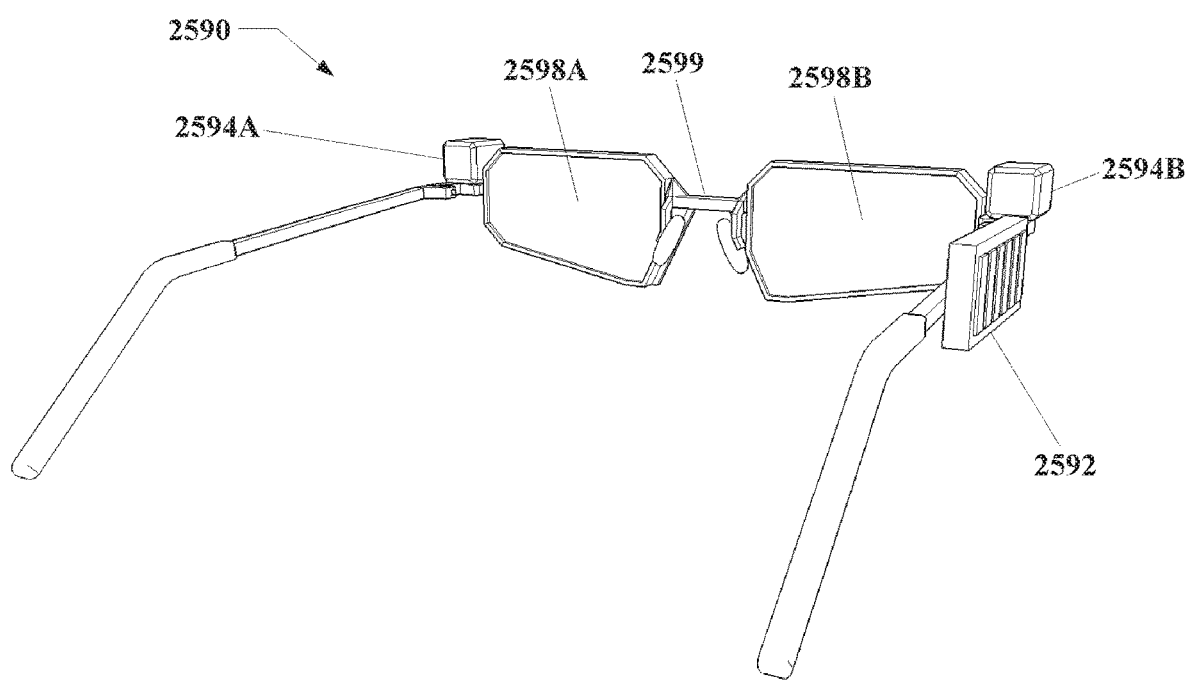
FIG. 25 shows an embodiment of a head mounted display in accordance with the present disclosure.

The present disclosure may be incorporated into and/or utilized with a broad range of other devices. For example, FIG. 25 shows an arrangement of an apparatus 2590 in accordance with the present disclosure as incorporated with a head mounted display. The embodiment shown in FIG. 25 includes with a processor 2592, first and second sensors 2594A and 2594B respectively, in a stereo arrangement, and first and second displays 2598A and 2598B respectively, also in a stereo arrangement. In addition, the apparatus 2590 includes a body 2599 in the form of a frame for a head mounted display; as shown the body 2599 resembles a pair of glasses, but this is an example only, and other configurations may be equally suitable.

The displays 2598A and 2598B are mounted to the body 2599, with the body 2599 being configured and the displays 2598A and 2598B being mounted such that when a user wears the apparatus 2590, the displays 2598A and 2598B are disposed proximate to and substantially aligned with the user's eyes. Likewise, the sensors 2594A and 2594B mounted to the body 2599 such that when a user wears the apparatus 2590 the field of view of the sensors 2594A and 2594B includes a region in front of the user, e.g. where the user would execute hand postures and/or gestures as input. In the arrangement of FIG. 25, the processor 2592 is also mounted to the body 2599.

However, such an arrangement is presented as an example only, and other embodiments may be equally suitable.

The above specification, examples, and data provide a complete description of the manufacture and use of the composition of the disclosure. Since many embodiments of the disclosure can be made without departing from the spirit and scope of the disclosure, the disclosure resides in the claims hereinafter appended.

The invention claimed is:

1. A method, comprising:
generating, by a processing device, a virtual object within a three-dimensional (3D) interface;
defining an interaction zone corresponding to the virtual object within the 3D interface;
detecting a first end-effector as entering the interaction zone, being within the interaction zone for a first qualifying threshold time, and withdrawing from the interaction zone;
detecting a second end-effector within a qualifying threshold distance relative to the first end-effector; and
executing a response corresponding to the virtual object.

2. The method of claim 1, wherein the response corresponds to a characteristic of the virtual object.

3. The method of claim 1, further comprising detecting a movement of the first end-effector within the interaction zone.

4. The method of claim 3, wherein the response corresponding to the virtual object comprises a swipe input response.

5. The method of claim 1, wherein the response corresponding to the virtual object comprises a tap input response.

6. The method of claim 1, wherein the response corresponding to the virtual object comprises a translational response.

7. The method of claim 1, wherein the response corresponding to the virtual object comprises a rotational response.

8. The method of claim 1, wherein the response corresponding to the virtual object comprises a scaling response based on the qualifying threshold distance of the second end-effector relative to the first end-effector.

9. The method of claim 1, wherein at least one of the first end-effector or the second end-effector comprises a finger.

10. The method of claim 1, wherein the response comprises movement of the virtual object constrained to be within the interaction zone.

11. The method of claim 1, wherein the response comprises movement of the virtual object not constrained by the interaction zone.

12. The method of claim 1, wherein the response comprises a compound movement of the virtual object.

13. The method of claim 1, wherein the response is different based on the first end-effector being within the interaction zone for a second qualifying threshold time that is greater than the first qualifying threshold time.

14. The method of claim 1, wherein the response comprises a change in a geometry of the virtual object.

15. The method of claim 1, wherein the response corresponds to a characteristic of the 3D interface.

16. The method of claim 1, wherein the response comprises a pegging operation corresponding to the virtual object.

17. The method of claim 1, wherein the response is determined based on a change in the qualifying threshold distance of the second end-effector relative to the first end-effector and/or a change in a orientation of the second end-effector relative to the first end-effector.

18. The method of claim 1, wherein the response is terminated in response to a distance of the second end-effector relative to the first end-effector being outside of the qualifying threshold distance.

19. A device, comprising:
a sensing device configured to sense a stimulus; and
a processing device coupled to the sensing device, wherein the processing device is configured to:
generate a virtual object within a three-dimensional (3D) interface;
define an interaction zone corresponding to the virtual object within the 3D interface;
detect the stimulus based on a first end-effector as being within the interaction zone for a first qualifying threshold time;
detect a second end-effector within a qualifying threshold distance relative to the first end-effector; and
execute a response corresponding to the virtual object.

20. An apparatus, comprising:
a sensing device; and
a processing device coupled to the sensing device, wherein the processing device is configured to:
generate a virtual object within a three-dimensional (3D) interface;
monitor an interaction zone corresponding to the virtual object within the 3D interface;
sensing a first end-effector as being within the interaction zone for a first qualifying threshold time;
sensing a second end-effector within a qualifying threshold distance relative to the first end-effector; and
execute a response corresponding to the virtual object.

* * * * *